(12) United States Patent
Kenny et al.

(10) Patent No.: US 12,509,903 B2
(45) Date of Patent: Dec. 30, 2025

(54) SYSTEM AND METHOD FOR MANUFACTURING A TOWER STRUCTURE

(71) Applicant: General Electric Renovables Espana, S.L., Barcelona (ES)

(72) Inventors: Christopher James Kenny, Schoharie, NY (US); Norman Arnold Turnquist, Carlisle, NY (US); Pascal Meyer, Burnt Hills, NY (US); Biao Fang, Clifton Park, NY (US); Juan Pablo Cilia, Delmar, NY (US); Xiaopeng Li, Niskayuna, NY (US); Collin McKee Sheppard, Greenville, SC (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 78 days.

(21) Appl. No.: 18/698,449

(22) PCT Filed: Oct. 5, 2021

(86) PCT No.: PCT/US2021/053460
§ 371 (c)(1),
(2) Date: Apr. 4, 2024

(87) PCT Pub. No.: WO2023/059311
PCT Pub. Date: Apr. 13, 2023

(65) Prior Publication Data
US 2024/0426129 A1    Dec. 26, 2024

(51) Int. Cl.
*E04H 12/34*    (2006.01)
*B33Y 10/00*    (2015.01)
(Continued)

(52) U.S. Cl.
CPC ............ *E04H 12/341* (2013.01); *B33Y 10/00* (2014.12); *B33Y 30/00* (2014.12); *B33Y 50/02* (2014.12);
(Continued)

(58) Field of Classification Search
None
See application file for complete search history.

(56) References Cited

U.S. PATENT DOCUMENTS 5,398,472 A * 3/1995 Eichelkraut ............ E04B 1/165
52/380
8,801,415 B2    8/2014 Khoshnevis
(Continued)

FOREIGN PATENT DOCUMENTS

CN    102853741 A    1/2013
CN    110261915 B    2/2021
(Continued)

OTHER PUBLICATIONS

PCT International Search Report & Written Opinion Corresponding to PCT/US2021/053460 on Jul. 1, 2022.
(Continued)

*Primary Examiner* — Yung-Sheng M Tsui
*Assistant Examiner* — Melody Tsui
(74) *Attorney, Agent, or Firm* — Dority & Manning, P.A.

(57) ABSTRACT

A system and method are provided for manufacturing a tower structure. Accordingly, a first printed layer of a wall element is deposited with a printhead assembly, and an actual midline perimeter length of the first printed layer is determined. A horizontal reinforcement assembly is then formed based, at least in part, on the actual midline perimeter length. The formed horizontal reinforcement assembly is positioned in a horizontal orientation on the first printed layer and in axial alignment with the vertical axis of the (Continued)

tower structure. With the horizontal reinforcement assembly positioned on the first printed layer, a second printed layer of the wall element is deposited via the printhead assembly on the horizontal reinforcement layer.

20 Claims, 11 Drawing Sheets

(51) Int. Cl.
    *B33Y 30/00*  (2015.01)
    *B33Y 50/02*  (2015.01)
    *B33Y 80/00*  (2015.01)
    *E04G 21/04*  (2006.01)
    *E04H 12/12*  (2006.01)
    *F03D 13/10*  (2016.01)

(52) U.S. Cl.
    CPC .............. *B33Y 80/00* (2014.12); *E04G 21/04* (2013.01); *E04H 12/12* (2013.01); *F03D 13/112* (2023.08)

(56) References Cited

U.S. PATENT DOCUMENTS

| | | | |
|---|---|---|---|
| 9,566,742 | B2 | 2/2017 | Keating et al. |
| 10,066,413 | B2 | 9/2018 | Khoshnevis |
| 10,543,619 | B2 * | 1/2020 | Hack ..................... E04B 2/845 |
| 10,810,734 | B2 | 10/2020 | Salgian et al. |
| 2017/0121959 | A1 * | 5/2017 | Kherat ................. B28B 1/001 |
| 2018/0071949 | A1 * | 3/2018 | Giles .................... B28B 1/001 |
| 2018/0093373 | A1 | 4/2018 | Niederberger |
| 2020/0024842 | A1 * | 1/2020 | Criado .................. B33Y 10/00 |
| 2021/0001542 | A1 | 1/2021 | Villette |
| 2021/0108412 | A1 * | 4/2021 | Heath .................... E04C 2/049 |
| 2021/0129377 | A1 * | 5/2021 | Mo ........................ B28B 1/522 |
| 2021/0347086 | A1 * | 11/2021 | Von Limburg ........... B28B 3/20 |
| 2021/0370609 | A1 * | 12/2021 | Nikshi ................... B28B 1/001 |
| 2022/0034108 | A1 | 2/2022 | Cooper et al. |
| 2022/0034116 | A1 | 2/2022 | Turnquist et al. |
| 2022/0034303 | A1 | 2/2022 | Turnquist et al. |
| 2022/0176586 | A1 * | 6/2022 | Mechtcherine ..... B28B 23/0006 |
| 2022/0341152 | A1 * | 10/2022 | Turnquist ................ F03D 13/10 |
| 2022/0396005 | A1 | 12/2022 | Lindemann et al. |
| 2022/0412107 | A1 | 12/2022 | Turnquist et al. |
| 2024/0033967 | A1 | 2/2024 | Kenny et al. |

FOREIGN PATENT DOCUMENTS

| | | | | |
|---|---|---|---|---|
| CN | 113024137 | B | 5/2023 | |
| EP | 3738750 | B1 | 11/2020 | |
| EP | 4074920 | A1 | 10/2022 | |
| GB | 2510598 | A * | 8/2014 | ............... E04B 1/16 |
| JP | 2015-217682 | A | 12/2015 | |
| KR | 20040041243 | A | 5/2004 | |
| KR | 101932227 | B1 | 12/2018 | |
| WO | WO-2016166116 | A1 * | 10/2016 | ............ B25J 9/0087 |
| WO | WO-2018132463 | A1 * | 7/2018 | ............ E02D 27/42 |
| WO | WO2020/068113 | A1 | 4/2020 | |
| WO | WO2020/068122 | A1 | 4/2020 | |
| WO | WO 2020/068124 | A1 | 4/2020 | |
| WO | WO2020/069070 | A1 | 4/2020 | |
| WO | WO-2020204966 | A1 * | 10/2020 | ......... E04G 21/0463 |
| WO | WO2021/098197 | A1 | 5/2021 | |
| WO | WO2021/101558 | A1 | 5/2021 | |
| WO | WO2023/059311 | A1 | 4/2023 | |

OTHER PUBLICATIONS

PCT International Preliminary Report on Patentability PCT/US2021/053460 on Apr. 9, 2024.

Casas et al., Fiber Optic Sensors for Bridge Monitoring, Journal of Bridge Engineering, vol. 8, Issue 6, Nov. 2003. https://ascelibrary.org/doi/abs/10.1061/(ASCE)1084-0702(2003)8:6(362).

Civil Engineering Seminar (SEC), Contour Crafting, Civil Engineering Seminar Topics, Jun. 2016, 14 Pages. University of Southern California—Contour Crafting.

Fernandez et al., 3D FEM Model Development from 3D Optical Measurement Technique Applied to Corroded Steel Bars, Construction and Building Materials, vol. 124, 2016, pp. 519-532. https://www.sciencedirect.com/science/article/abs/pii/S0950061816312338.

Frangez et al., Depth-Camera-Based Rebar Detection and Digital Construction for Robotic Concrete Spraying, Construction Robotics, vol. 5, 2021, pp. 191-202.

Ji et al., A 3D Printed Ready-Mixed Concrete Power Distribution Substation: Materials and Construction Technology, Materials, vol. 12(9): 1540, 2019, 14 Pages. A 3D Printed Ready-Mixed Concrete Power Distribution Substation: Materials and Construction Technology.

Khoshnevis, Automated Construction by Contour Crafting—Related Robotics and Information Technologies, Journal of Automation and Construction—Special Issue: The Best of ISARC 2002, vol. 13, Issue 1, Jan. 2004, pp. 5-19. Automated Construction By Contour Crafting—Related Robotics and Information Technologies.

Kloft et al., Reinforcement Strategies for 3D-Concrete-Printing, Civil Engineering Design, vol. 2, Issue 4, Aug. 2020, pp. 131-139. Reinforcement strategies for 3D-concrete-printing.

Lap Industries, Concrete Pro, Brochure: Laser Projection Systems for Production of Precast Concrete Parts, 5 Pages. Laser projectors for the precast concrete parts industry.

Mason, Lase Projection Systems Improve Composite Ply Placement, Airtech Large Scale 3D Printing, 7 Pages. Laser Guided Play Assembly.

Mohan et al., Extrusion-Based Concrete 3D Printing from a Material Perspective: A State-of-the-art Review, Cement and Concrete Composites, vol. 115, Jan. 2021. (Abstract Only). Extrusion-based concrete 3D printing from a material perspective: A state-of-the-art review.

Nematollahi et al., Current Progress of 3D Concrete Printing Technologies, 34th International Symposium on Automation and Robotics in Construction (ISARC 2017), 8 Pages. Current Progress of 3D Concrete Printing Technologies.

Nerella et al., Incorporating Reinforcement into Digital Concrete Construction, Conference: The annual Symposium of the IASS—International Association for Shell and Spatial Structures: Creativity in Structural Design At: MIT, Cambridge, Jul. 2018, 9 Pages. Incorporating reinforcement into digital concrete construction.

Omuro et al., Three-Dimensional Printing of Continuous Carbon Fiber Reinforced Thermoplastics by In-Nozzle Impregnation with Compaction Roller, Materials Science Engineering, 21st International Conference on Composite Materials Xi'an, 2017, 6 Pages. Three-dimensional Printing Of Continuous Carbon Fiber Reinforced Thermoplastics By In-nozzle Impregnation With Compaction Roller.

Tang et al., A Review on Fiber Optic Sensors for Rebar Corrosion Monitoring in RC Structures, Construction and Building Materials, vol. 313, Dec. 27, 2021, 125578. https://www.sciencedirect.com/science/article/abs/pii/S0950061821033158 (Abstract Only).

Ueda et al., 3D Compaction Printing of a Continuous Carbon Fiber Reinforced Thermoplastic, Composites Part A: Applied Science and Manufacturing, vol. 137, Oct. 2020. (Abstract Only) 3D compaction printing of a continuous carbon fiber reinforced thermoplastic.

* cited by examiner

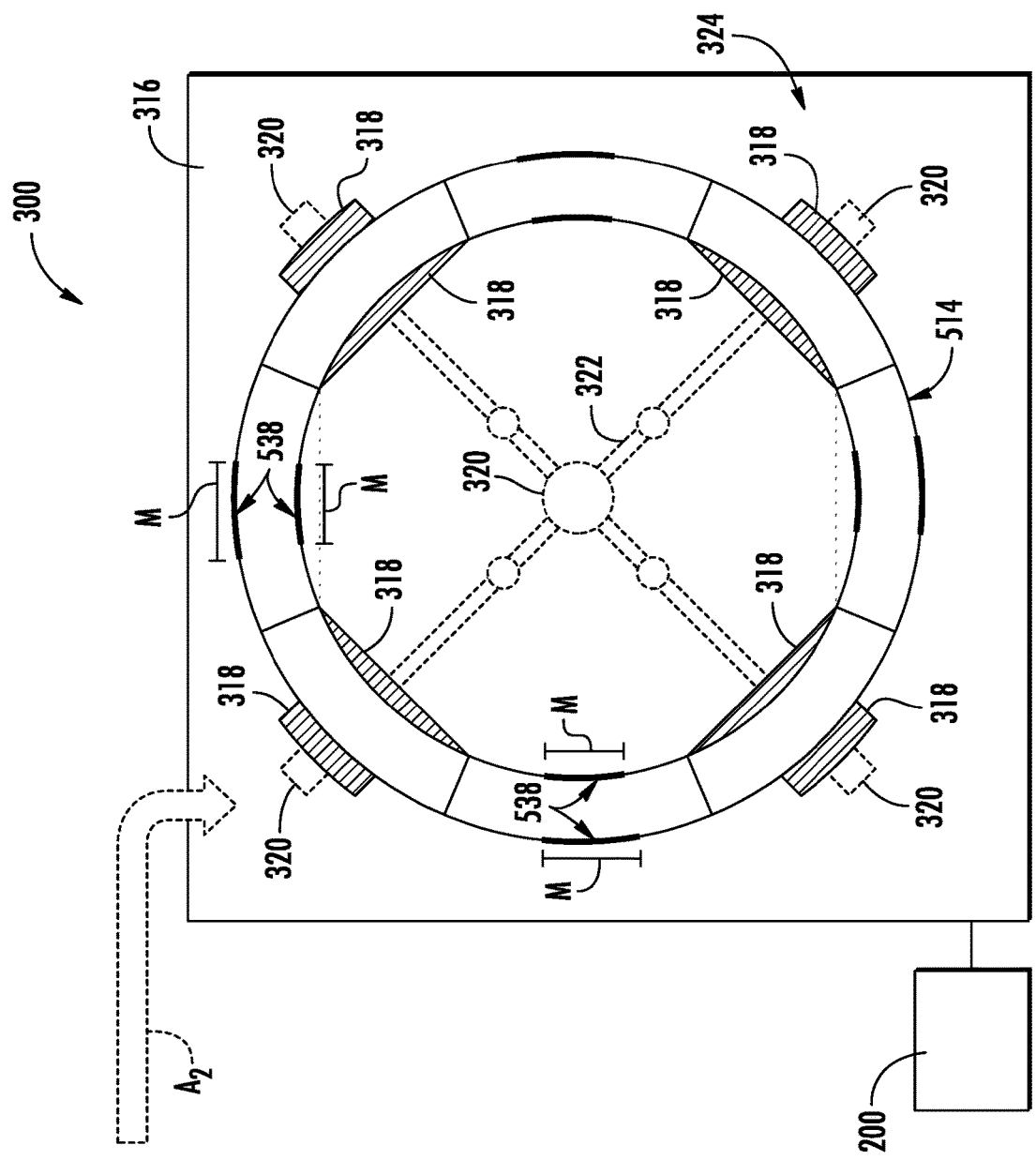
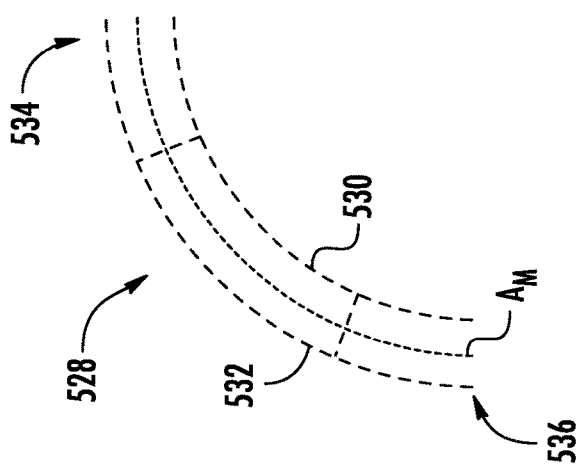
FIG. 4

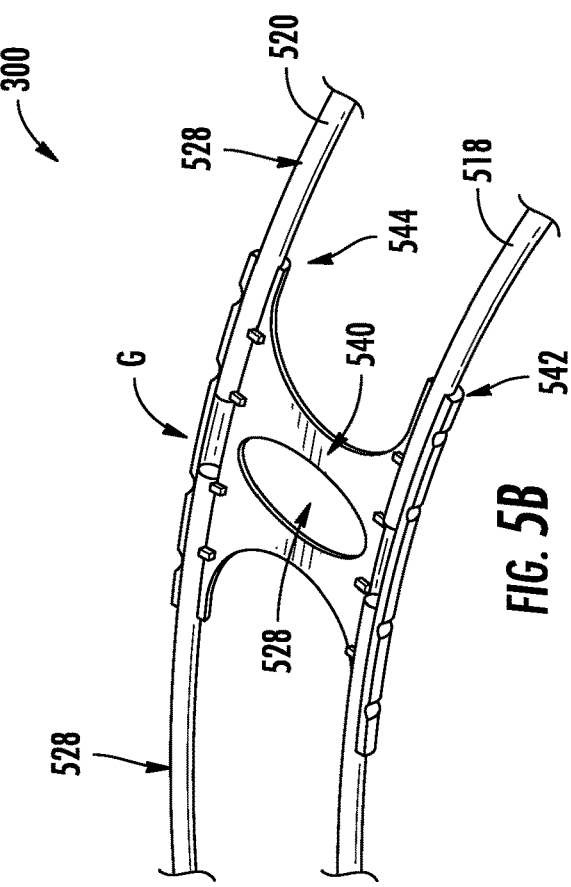
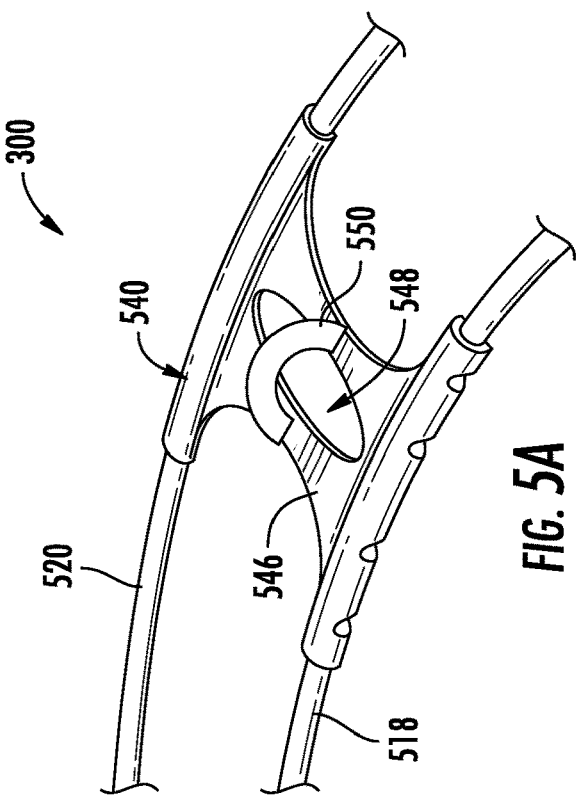
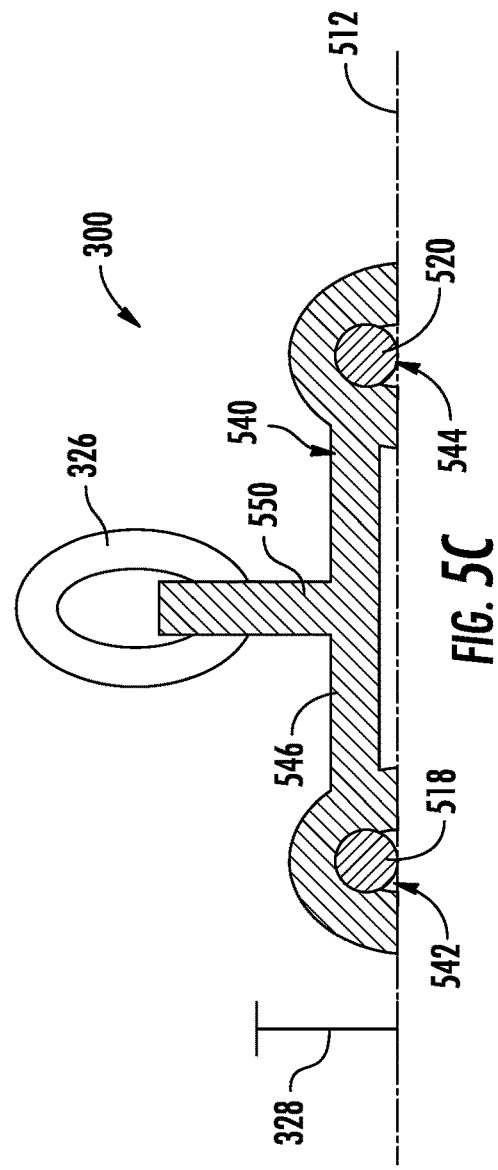

SYSTEM AND METHOD FOR MANUFACTURING A TOWER STRUCTURE

STATEMENT REGARDING FEDERALLY SPONSORED RESEARCH OR DEVELOPMENT

This invention was made with Government support under Contract No. DE-EE0009059 awarded by the U.S. Department of Energy (DOE). The Government has certain rights in the invention.

RELATED APPLICATION

The present application claims priority to PCT Application Serial Number PCT/US2021/053460, filed on Oct. 5, 2021, which is incorporated by reference herein.

FIELD

The present disclosure relates in general to tower structures, and more particularly to systems and methods for additively manufacturing tower structures, such as for supporting wind turbines.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The nacelle includes a rotor assembly coupled to the gearbox and to the generator. The rotor assembly and the gearbox are mounted on a bedplate support frame located within the nacelle. The one or more rotor blades capture kinetic energy of wind using known airfoil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy and the electrical energy may be transmitted to a converter and/or a transformer housed within the tower and subsequently deployed to a utility grid. Modern wind power generation systems typically take the form of a wind farm having multiple such wind turbine generators that are operable to supply power to a transmission system providing power to an electrical grid.

Tower structures, and in particular wind turbine towers, are often constructed of steel tubes, pre-fabricated concrete sections, or combinations thereof. Further, the tubes and/or concrete sections are typically formed off-site, shipped on-site, and then arranged together to erect the tower. For example, one manufacturing method included forming pre-cast concrete rings, shipping the rings to the site, arranging the rings atop one another, and then securing the rings together. As tower heights increase, however, conventional manufacturing methods are limited by transportation regulations that prohibit shipping of tower sections having a diameter greater than about 4 to 5 meters. Thus, certain tower manufacturing methods include forming a plurality of arc segments and securing the segments together on site to form the diameter of the tower, e.g. via bolting and/or welding. Such methods, however, require extensive labor and can be time-consuming.

Thus, the art is continuously seeking new and improved methods for manufacturing towers. Accordingly, the present disclosure is directed to systems and methods for manufacturing towers that address the aforementioned issues. In particular, the present disclosure is directed to methods for additively manufacturing the tower structures on-site using automated additive printing devices and reinforcing the tower structure.

BRIEF DESCRIPTION

Aspects and advantages of the invention will be set forth in part in the following description, or may be obvious from the description, or may be learned through practice of the invention.

In one aspect, the present disclosure is directed to a method for manufacturing a tower structure. The method may include depositing, via an additive printing system, a first printed layer of a wall element with a printhead assembly. The wall element may circumscribe a vertical axis of the tower structure. A controller of the additive printing system may determine an actual midline perimeter length of the first printed layer. The method may also include forming a horizontal reinforcement assembly based, at least in part, on the actual midline perimeter length. The horizontal reinforcement assembly may be positioned in a horizontal orientation on the first printed layer and in axial alignment with the vertical axis. Additionally, the method may include depositing, via the additive printing system, a second printed layer of the wall element with the printhead assembly on the horizontal reinforcement assembly.

In another aspect, the present disclosure is directed to an additive printing system for manufacturing a tower structure. The tower structure may include a wall element circumscribing a vertical axis of the tower structure. The additive printing system may include a support structure and an optical scanner. The additive printing system may also include a printhead assembly operably coupled to the support structure. Further, the additive printing system may include a controller communicatively coupled to the printhead assembly and the optical scanner. The controller may include at least one processor configured to perform or direct a plurality of operations. The plurality of operations may include any of the operations and/or features described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 4 illustrates an overhead view of an embodiment of the horizontal reinforcement assembly and a jig table according to the present disclosure;

FIG. 5A illustrates a perspective top view of a portion of the horizontal reinforcement assembly according to the present disclosure;

FIG. 5B illustrates a perspective bottom view of the portion of the horizontal reinforcement assembly of FIG. 5A according to the present disclosure;

FIG. 5C illustrates a simplified cross-sectional view of the portion of the horizontal reinforcement assembly of FIG. 5A according to the present disclosure;

Figure 1:
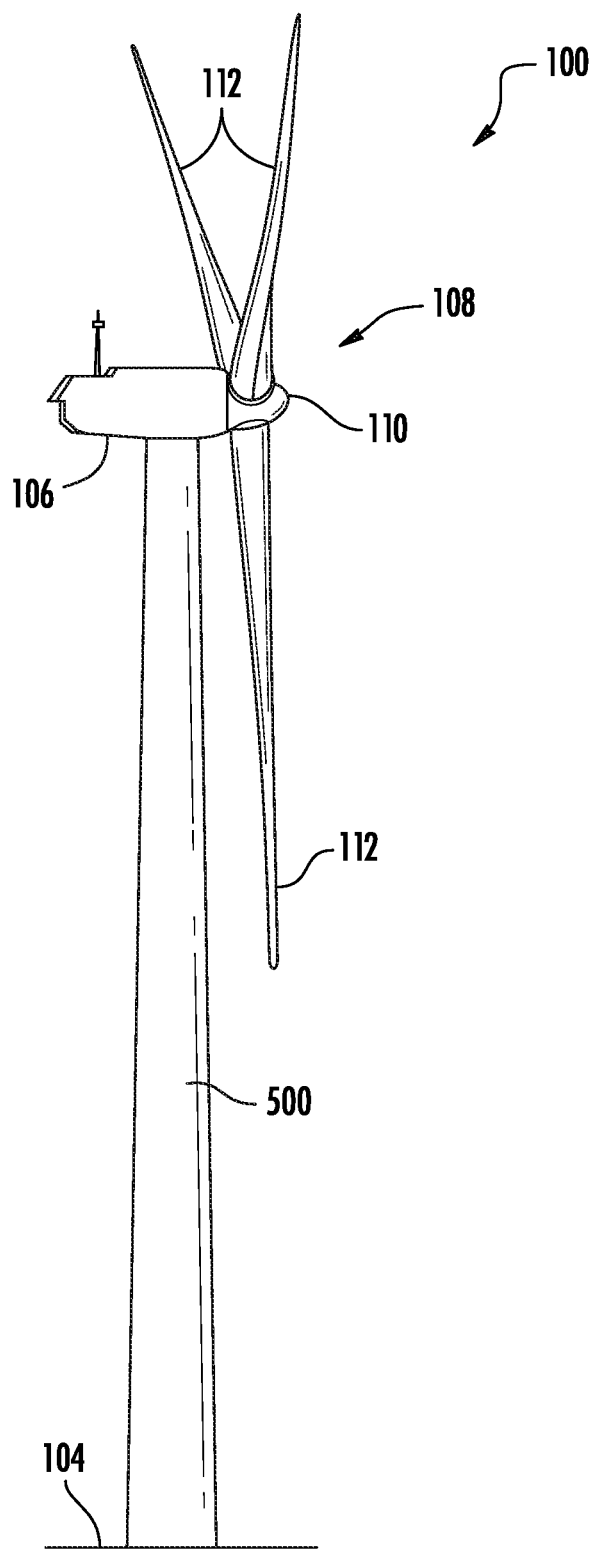
FIG. 1 illustrates a perspective view of one embodiment of a tower structure supporting a wind turbine according to the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present disclosure is directed to an additive printing system and methods for manufacturing a tower structure, such as a wind turbine tower. Additively printed tower structures are typically formed via the deposition of sequential layers (e.g., print layers) of a cementitious material, such as concrete. However, in order to achieve the desired structural strength, additively printed towers generally require reinforcement. Known methods for reinforcing towers often utilize vertical rebar and/or a rebar cage. For example, a common construction practice is to manually place a prefabricated rebar cage in the desired location prior to pouring concrete. While such approaches may reinforce the tower structure, they are often labor intensive and costly, and may not be compatible with construction via additive printing. Additionally, known methods of reinforcing an additively printed tower structure may not accurately place the reinforcing elements in an optimal position within the structure. Accordingly, the present application presents novel methods for forming and positioning a horizontal reinforcement assembly of the tower structure that are simple, accurate, non-labor-intensive, and cost-effective.

In order to provide simple, accurate, non-labor-intensive, and cost-effective reinforcement to an additively printed tower structure, the present application utilizes a ring-shaped horizontal reinforcement assembly that is accurately sized and placed upon a printed layer of the tower structure before an additional printed layer is added on top. To that end, the actual midline perimeter length of the first printed layer may be determined. The horizontal reinforcement assembly may then be formed based, at least in part, on the actual midline perimeter. In other words, the dimensions of the horizontal reinforcement assembly may be tailored to the actual physical dimensions of the first printed layer deposited by the additive printing system prior to placement on the first printed layer.

Referring now to the drawings, FIG. 1 illustrates a perspective view of an embodiment of a tower structure 500 according to the present disclosure. As depicted in FIG. 1, the tower structure may be a component of a wind turbine 100. As shown, the wind turbine 100 generally includes a tower structure 500 extending from a support surface 104, a nacelle 106, mounted on the tower structure 500, and a rotor 108 coupled to the nacelle 106. The rotor 108 includes a rotatable hub 110 and at least one rotor blade 112 coupled to and extending outwardly from the hub 110. For example, in the illustrated embodiment, the rotor 108 includes three rotor blades 112. However, in an alternative embodiment, the rotor 108 may include more or less than three rotor blades 112. Each rotor blade 112 may be spaced about the hub 110 to facilitate rotating the rotor 108 to enable kinetic energy to be transferred from the wind into usable mechanical energy, and subsequently, electrical energy. For instance, the hub 110 may be rotatably coupled to an electric generator (not shown) positioned within the nacelle 106 to permit electrical energy to be produced.

It should be appreciated that while discussed herein in reference to a wind turbine tower, the present disclosure is not limited to wind turbine towers but may be utilized in any application having concrete construction and/or tall tower structures. For example, the present disclosure may be utilized in the additive manufacturing of homes, buildings, portions of buildings, bridges, towers, poles, and other aspects of the concrete industry. Further, the methods described herein may also apply to manufacturing any similar structure that benefits from the advantages described herein.

Referring now to FIGS. 2-9, wherein multiple embodiments of the tower structure 500, and the additive printing system 300 for forming the same, are depicted in accordance with the present disclosure. As shown the tower structure 500 may be formed by depositing one or more layers of a wall element 502 with a printhead assembly 302 of the additive printing system 300. In an embodiment, the wall element 502 may circumscribe a vertical axis ($V_A$) of the tower structure 500. Each wall element 502 may for example, be one of a plurality of print layers in an axially aligned arrangement to form the tower structure 500. As shown, the wall element 502 may generally define a hollow interior 504 that may, in a wind turbine 100, be employed to house various turbine components. In addition, as will be described in more detail below, the tower structure 500 may be formed using additive manufacturing. It should be appreciated that, the tower structure 500 may be formed from at least one cementitious material 506.

It should be appreciated that the tower structure 500 may include a structure having a height that is greater than a maximal horizontal dimension. By way of non-limiting illustrations, the tower structure 500 may include a wind turbine support tower, a cooling tower, a communications tower, a bridge pylon, a smokestack, a transmission tower, an observation tower, a dwelling, an office, an ornamental tower, a water tower, and/or other similar structures.

As used herein, the cementitious material 506 may include any suitable workable paste that may be configured to bind together after curing to form a structure. Suitable cementitious materials may include, for example, concrete, pitch resin, asphalt, clay, cement, mortar, cementitious compositions, or other similar materials or compositions.

Figure 2:
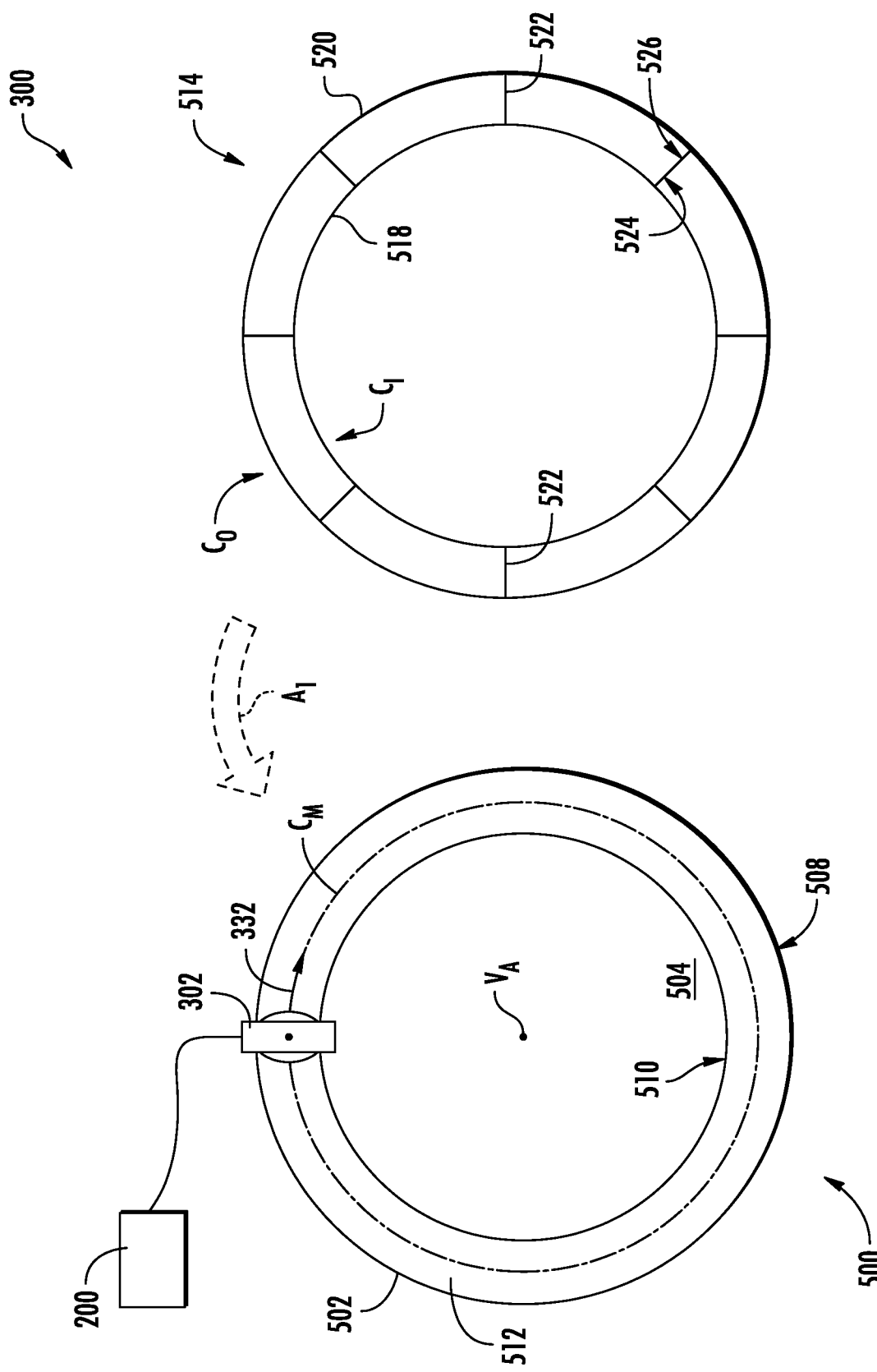
FIG. 2 illustrates an overhead view of a portion of the additive printing system, a portion of the tower structure of FIG. 1, and a horizontal reinforcement assembly according to the present disclosure.

As depicted in the overhead view (e.g., layer view) of the tower 500 illustrated in FIG. 2, the wall element 502 may, in an embodiment, have an outer circumferential face 508 corresponding to each layer of the wall element 502. The outer circumferential face 508 may have a maximal radial distance from the vertical axis ($V_A$). The outer circumferential face 508 may, for example, be generally circular, circumscribing the vertical axis ($V_A$).

In an embodiment, the wall element 502 may have an inner circumferential face 510 corresponding to each layer of the wall element 502. The inner circumferential face 510 may have a minimal radial distance from the vertical axis ($V_A$). The inner circumferential face 510 may, for example, be generally circular, circumscribing the vertical axis ($V_A$).

Figure 7:
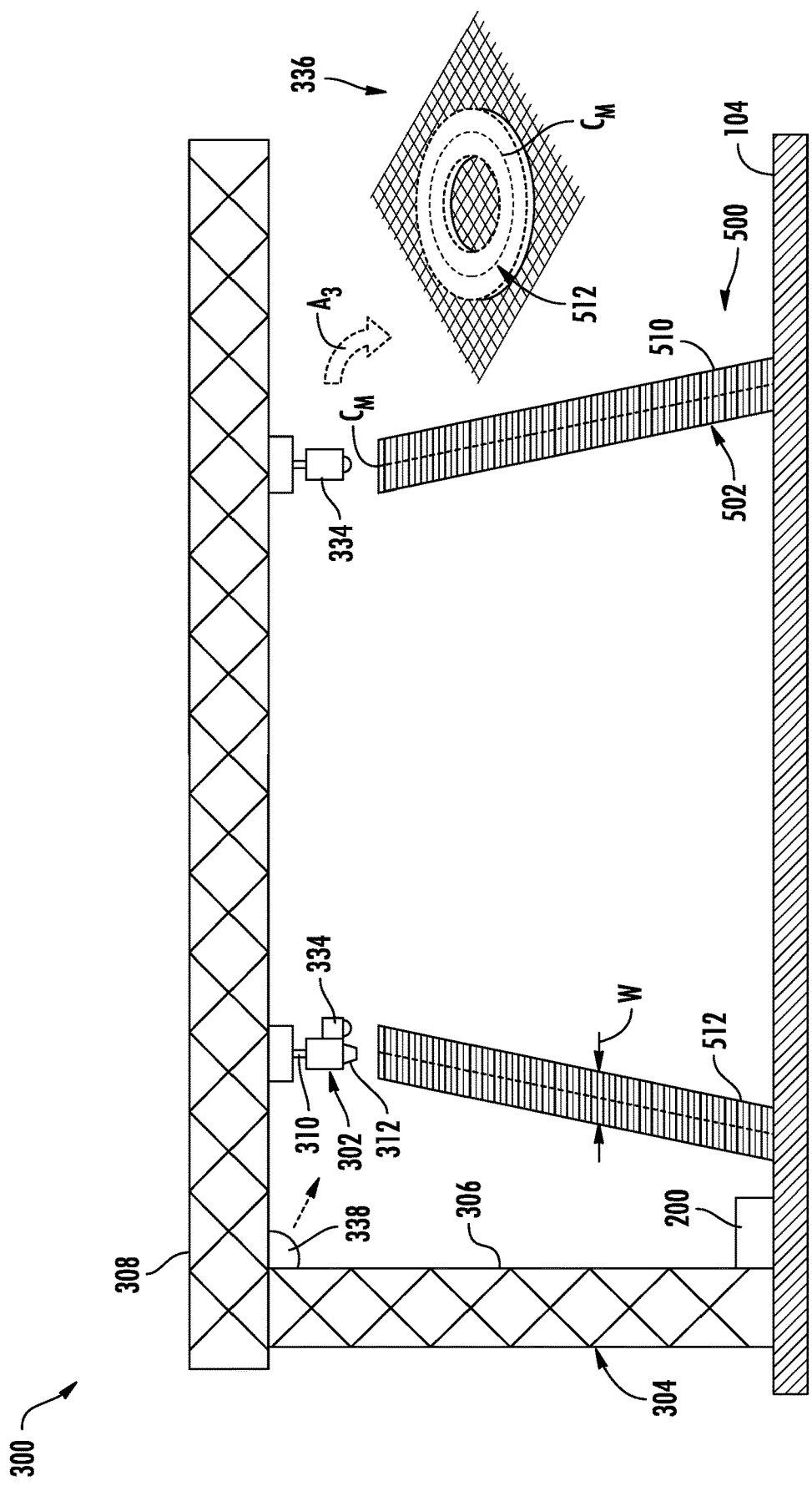
FIG. 7 illustrates a simplified profile view of an additive printing system for additively manufacturing a tower structure according to the present disclosure.

As particularly depicted in FIGS. 2 and 7, in an embodiment, a midline reference curve ($C_M$) may be defined for each layer of the tower structure 500. The midline reference curve ($C_M$) may be equidistant between the outer circumferential face 508 and the inner circumferential face 510 for the layer. Accordingly, the midline reference curve ($C_M$) may be generally circular, circumscribing the vertical axis ($V_A$). It should be appreciated that the midline reference curve ($C_M$) may represent a radial neutral point corresponding to the width/thickness (W) of the wall element 502.

According to aspects of the present disclosure, the tower structure 500 may be additively manufactured via the additive printing system 300. Notably, all or part of the tower structure 500, in particular, the wall element 502, may be printed layer-by-layer, using the additive printing system 300. The additive printing system 300 may use any suitable means for depositing layers of additive material, such as concrete, to form the tower structure 500. Thus, aspects of the present subject matter are directed to methods for manufacturing a tower structure 500, such as a wind turbine tower, via additive manufacturing.

As used herein, "additive manufacturing" may generally be understood to encompass processes used to synthesize three-dimensional objects in which successive layers of material are formed under computer control to create the objects as such, objects of any size and/or shape can be produced from digital model data. It should be further understood that the additive manufacturing methods of the present disclosure may encompass three degrees of freedom, as well as more than three degrees of freedom, such that the printing techniques are not limited to printing stacked two-dimensional layers but are also capable of printing curved and/or irregular shapes.

Figure 3:
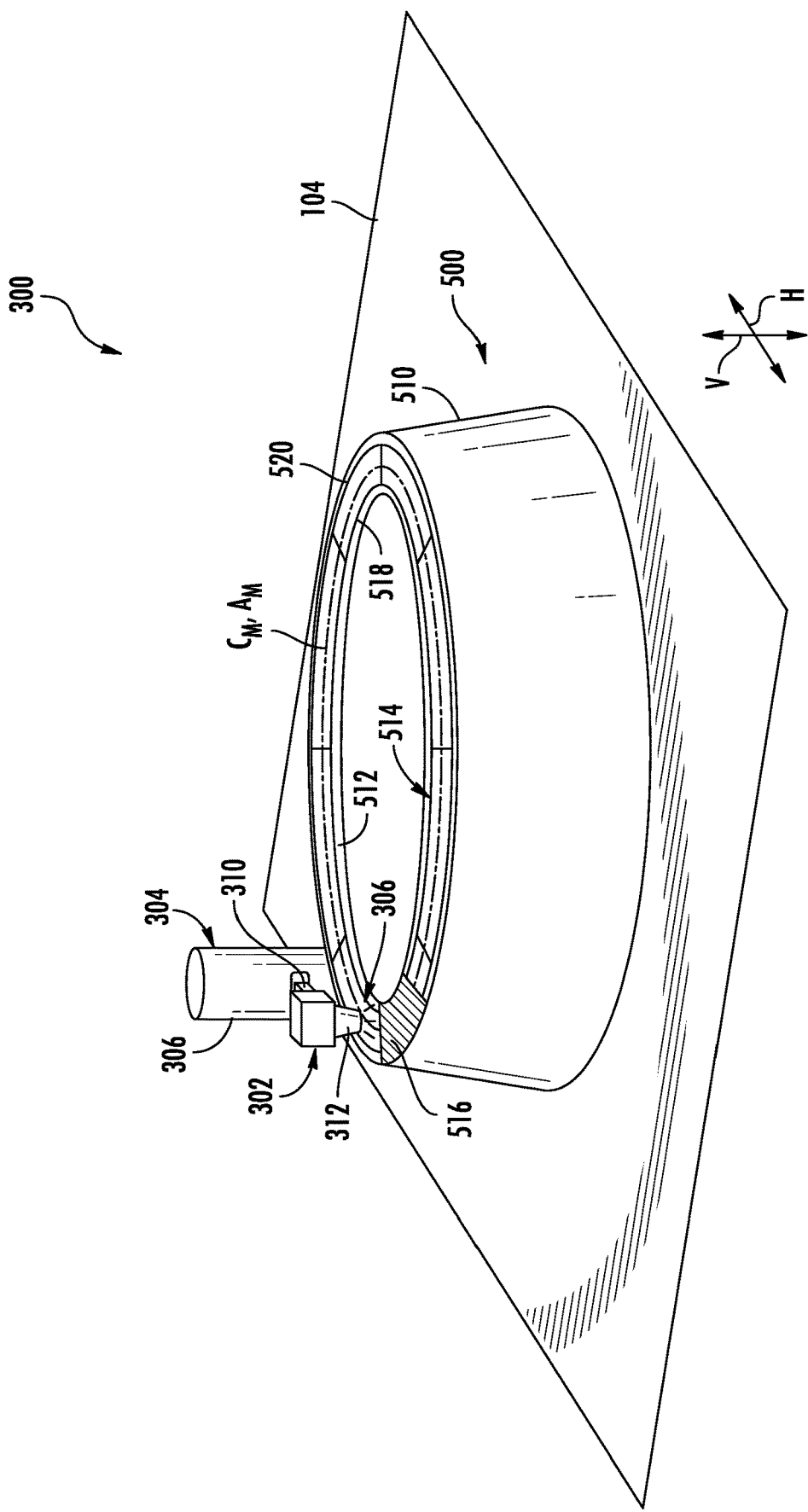
FIG. 3 illustrates a perspective view of the tower structure of FIG. 1 according to the present disclosure.

As particularly depicted FIGS. 3 and 7, in an embodiment, the additive printing system 300 may include a support structure 304. The support structure 304 may extend from the ground and/or from the support surface 104 along a generally vertical direction (V). In an embodiment, the support structure 304 may include at least one vertical support component 306. As depicted, in an embodiment, the vertical support component(s) 306 may be located radially outward of the tower structure 500. However, in an additional embodiment, the vertical support component(s) 306 may be located radially inward of the wall element 502.

The vertical support component(s) 306 may, in an embodiment, support a horizontal support component 308. The vertical support component(s) 306 and the horizontal support component 308 may, in an embodiment, be a truss-like structure (e.g., similar to a tower crane). However, the vertical support component(s) 306 and the horizontal support component 308 may be formed in the other suitable manner or have any other configuration according to alternative embodiments. The horizontal support component 308 may, in an embodiment, be rotatable about the vertical support component(s) 306. In an additional embodiment, the horizontal support component 308 may be movably coupled to the vertical support component(s) 306 so as to permit the horizontal support component 308 to move in the vertical direction (V).

In at least one embodiment, the vertical support component(s) 306 may be configured to have a height that increases in step with the tower structure 500 during the manufacturing thereof. In such an embodiment, additional segments may be combined with the vertical support component(s) 306 to raise the vertical support structure using a jacking system. In general, the jacking system may be positioned proximate the support surface 104 and may be configured for raising the vertical support component(s) 306 and inserting additional segments.

The support structure 304 may be configured to support at least one support arm 310 movably coupled thereto. The support arm(s) 310 may be configured to position at least one component of the additive printing system 300 adjacent to the tower structure 500. The support arm(s) 310 may also be configured to deliver power, air, cementitious material, form material, or other resources to the supported component. In an additional embodiment, the support arm(s) 310 may also be equipped with at least one sensor 311 for detecting a position of the support arm(s) 310 relative to the tower structure 500.

The additive printing system 300 may include the printhead assembly 302 supported by the support structure 304. The printhead assembly 302 may be positioned over the support surface 104 or preceding layers of the wall element 502 by at least one of the horizontal support component 308 and/or the support arm(s) 310. The printhead assembly 302 may include a print nozzle 312. The print nozzle 312 may be configured to direct and/or shape a flow of cementitious material 506 during the additive printing of the tower structure 500.

Referring again to FIGS. 2-9 in general, in an embodiment, the additive printing system 300 may be employed to deposit a first printed layer 512 of the wall element 502. The first printed layer 512 may be deposited with the printhead assembly 302. A controller 200 of the additive printing system 300 may then be utilized to determine an actual midline perimeter length of the first printed layer 512. The actual midline perimeter length may correspond to the circumferential length of the midline reference curve ($C_M$). Based, at least in part, on the actual midline perimeter length of the first printed layer 512, a horizontal reinforcement assembly 514 may be formed. The fully assembled/formed horizontal reinforcement assembly 514 may then be positioned in a horizontal (H) orientation on the first printed layer 512 and in axial alignment with the vertical axis ($V_A$). Following the positioning of the fully assembled/formed horizontal reinforcement assembly 514 on the first printed layer 512, the additive printing system 300 may deposit a second printed layer 516 of the wall element 502 with the printhead assembly 302 on the horizontal reinforcement assembly 514. It should be appreciated that forming the horizontal reinforcement assembly 514 may, for example, include establishing an inner circumference ($C_I$) and/or an outer circumference ($C_O$) of the horizontal reinforcement assembly 514 that is proportional to the actual midline perimeter length.

FIG. 2 depicts a portion of a method 400 for manufacturing the tower structure 500 prior to positioning the horizontal reinforcement assembly 514 on the first printed layer 512. According to the method 400, the horizontal reinforcement assembly 514 may be positioned on the first printed layer 512 as depicted by arrow $A_1$. FIG. 3, therefore, depicts a portion of the method 400 following the positioning of the horizontal reinforcement assembly 514 on the first printed layer 512. FIG. 3 also illustrates a portion of the second printed layer 516 deposited on the horizontal reinforcement assembly 514.

The horizontal reinforcement assembly 514 may, in an embodiment, include an inner rail 518. The inner rail 518 may have a length that is less than the actual midline perimeter length. In an embodiment, the horizontal reinforcement assembly 514 may include an outer rail 520. The outer rail 520 may have a length that is greater than the actual midline perimeter length. Additionally, in an embodiment, the horizontal reinforcement assembly 514 may include a plurality of transverse members 522. Each transverse member of the plurality of transverse members 522 may have a first end 524 coupled to the inner rail 518. In an embodiment, each transverse member of the plurality of transverse members 522 may have a second end 526 coupled to the outer rail 520.

It should be appreciated that the inner rail 518 and/or the outer rail 520 may have a shape corresponding to a horizontal shape of the first printed layer. For example, in an embodiment wherein the tower structure 500 has a generally cylindrical or conical shape, the horizontal shape may be generally circular. In such an embodiment, the inner rail 518 and/or the outer rail 520 may have a generally circular shape. By way of an additional example, in an embodiment wherein the tower structure 500 has a generally polygonal shape, the horizontal shape may include a plurality of angles/corners joined by a plurality of straight and/or curved sections. In such an embodiment, the inner rail 518 and/or the outer rail 520 may have a shape which mirrors the plurality of angles/corners joined by the plurality of straight and/or curved sections.

As particularly the depicted in FIG. 4, in an embodiment, the horizontal reinforcement assembly 514 may include a plurality of prefabricated reinforcement segments 528. For example, in an embodiment, the horizontal reinforcement assembly 514 may include three prefabricated reinforcement segments 528, with each prefabricated reinforcement segment 528 covering a 120-degree arc of the midline reference curve ($C_M$). In an additional embodiment, the horizontal reinforcement assembly 514 may include four prefabricated reinforcement segments 528, with each prefabricated reinforcement segment 528 covering a 90-degree arc of the midline reference curve ($C_M$). In a further embodiment, the horizontal reinforcement assembly 514 may include six prefabricated reinforcement segments 528, with each prefabricated reinforcement segment 528 covering a 60-degree arc of the midline reference curve ($C_M$). It should, therefore, be appreciated that in an embodiment, forming the horizontal reinforcement assembly 514 may include receiving the plurality of prefabricated reinforcement segments 528.

Each of the plurality of prefabricated reinforcement segments 528 may, in an embodiment, include an inner rail segment 530 coupled to an outer rail segment 532 via a portion of the plurality of transverse members 522. Each of the plurality of prefabricated reinforcement segments 528 may have a first segment end 534 and a second segment end 536 opposite thereof. The first segment end 534 and the second segment end 536 may be defined by the inner and outer rail segments 530, 532.

It should be appreciated that the midline reference curves ($C_M$) of the print layers of the wall element 502 may have different actual midline perimeter lengths at various heights of the tower structure 500. For example, the tower structure 500 may taper with an increase in height. As a result, a midline reference curve ($C_M$) of a print layer near the support surface 104 may have a greater actual midline perimeter length than the actual midline perimeter length of a midline reference curve ($C_M$) adjacent the ultimate height of the tower structure 500. However, in an embodiment each of the plurality of prefabricated reinforcement segments 528 of the tower structure 500 may be pre-formed/manufactured to with a fixed length (e.g., arc length). Therefore, the fixed length of the prefabricated reinforcement segments 528 may be accommodated as further described below in order to form the horizontal reinforcement assembly 514 in accordance with the actual midline perimeter of the print layer upon which it is positioned prior to the deposition of the second printed layer 516.

In order to form (e.g., tailor) the horizontal reinforcement assembly 514 to coincide with the actual midline perimeter length of the first printed layer 512, at least one overlap 538 between adjacent prefabricated reinforcement segments 528 of the plurality of prefabricated reinforcement segments 528 may be established. The magnitude (M) of the overlap 538 may facilitate the establishment of the inner circumference ($C_I$) and/or the outer circumference ($C_O$) at a value that is proportional to the midline reference curve ($C_M$). In other words, the overlap 548 may facilitate the establishment of a reinforcement assembly midline perimeter length based on the actual midline perimeter length of the first print layer 512. For example, in an embodiment, the reinforcement assembly midline perimeter length may equal the actual midline perimeter length. It should be appreciated that the reinforcement assembly midline perimeter length may represent a length of an assembly midline reference curve ($A_M$) that is radially equidistant between the inner and outer rail segments 530, 532.

In an embodiment, each of the plurality of prefabricated reinforcement segments 528 may be coupled to an adjacent segment in order to form the horizontal reinforcement assembly 514. For example, the first segment end 534 of each of the plurality of prefabricated reinforcement segments 528 and the second segment end 536 of each adjacent segment may be coupled. The coupling of the adjacent segments may establish the overlap 538 based on the determined magnitude (M). In an embodiment, the magnitude (M) of the overlap 538 may correspond to a determined quantity of degrees of arc that the respective first and second segment ends 534, 536 may be in direct contact with one another and may be fixedly coupled thereto. In an additional embodiment, the magnitude (M) of the overlap 538 may correspond to zero degrees of arc and the adjacent segments may be coupled to one another via a coupler unit 540. In a further embodiment, the magnitude (M) may correspond to a gap/separation (G) (e.g., as depicted in FIG. 5B) between adjacent segments, therefore necessitating the employment of the coupler unit 540 to couple of the adjacent sections to one another. It should be appreciated that the coupler unit 540 may be configured to establish the reinforcement assembly midline perimeter length based on the actual midline perimeter length As depicted in FIGS. 5A-5C, in an embodiment, the coupler unit 540 may include a first channel 542 configured to receive a portion of the inner rail 518. The coupler unit 540 may also, in an embodiment include a second channel 544 configured to receive a portion of the outer rail 520. The first channel 542 and the second channel 544 may be generally parallel to one another. In an embodiment, the first and second channels 542, 544 may facilitate the coupling of the coupler unit 540 to adjacent prefabricated reinforcement segments 528. In other words, the corresponding portions of the first and second ends 534, 536 of the prefabricated reinforcement segments 528 may be secured within the first and second channels 542, 544 via crimping (e.g., as depicted in FIGS. 5A and 5B), welding, adhesives, fasteners, and/or other means suitable for establishing a fixed connection between the prefabricated reinforcement segments 528 and the coupler unit 540.

As further depicted in FIGS. 5A-5C, in an embodiment, the coupler unit 540 may include a plate structure 546. The plate structure 546 may extend in a radial direction so as to establish a radial position of the first channel 542 and a radial position of the second channel 544. The plate structure 546 may also define a guide orifice 548. The guide orifice may, for example, facilitate the positioning of cables, conduits, and/or tensioning elements of the tower structure 500.

Referring still to FIGS. 5A and 5C, in an embodiment, the coupler unit 540 may include a lifting interface 550. The lifting interface 550 may be configured to couple to at least one lifting element 326 in order to facilitate the positioning of the fully assembled horizontal reinforcement assembly 514 on the first print layer 512. The lifting interface 550 may be a flexible element configured to translate from a generally vertical orientation to a generally horizontal orientation when the horizontal reinforcement assembly 514 is positioned on the first print layer 512 and the lifting element(s) 326 is decoupled. For example, in an embodiment, the lifting interface 550 may be a cable, a hinged element, and/or a deformable plate element. It should be appreciated that transitioning the lifting interface 550 to a generally horizontal orientation may mitigate a disruption of the second print layer 516 resulting from the lifting interface 550.

As depicted in FIG. 5C, in an embodiment, an operable coupling may be established between the lifting element(s) 326 and the horizontal reinforcement assembly 514 via the lifting interface 550. The lifting element(s) 326 may be positioned so as to establish a separation 328 relative to the first printed layer 512 when the horizontal reinforcement assembly 514 is positioned thereon. Following the positioning of the horizontal reinforcement assembly 514 on the first printed layer 512, the lifting element(s) 326 may be released. Accordingly, the lifting element(s) 326 may be separated from the horizontal reinforcement assembly 514 while the separation 328 is maintained or increased relative to the first print layer 512. By at least maintaining the separation 328, contact between the lifting element(s) 326 and the first printed layer 512 may be precluded. Precluding contact between the lifting element(s) 326 and the cementitious material 506 of the first printed layer 512, which may remain soft/uncured during the positioning of the horizontal reinforcement assembly 514, may mitigate/preclude damage to the first printed layer 512. It should be appreciated that precluding damage to the first printed layer 512 may increase the structural integrity of the tower structure 500 relative to that obtainable in the presence of a damaged first printed layer 512.

As depicted in FIG. 4, in an embodiment, the additive printing system 300 may include a jig table 316. The jig table 316 may be positioned on the ground/support surface 104 at the installation location of the tower structure 500. For example, the jig table 316 may be positioned adjacent to the tower structure 500. The jig table 316 may be configured to receive (e.g., as shown by arrow $A_2$) the plurality of prefabricated reinforcement segments 528. In an embodiment, the jig table 316 may be sized to support the horizontal reinforcement assembly 514 when fully formed (e.g., with the adjacent segments of the plurality of prefabricated reinforcement segments 528 being coupled to one another) and in a horizontal orientation.

The jig table 316 may, in an embodiment, include a plurality of movable stops 318. The plurality of movable stops 318 may, for example, be configured to orient/position the plurality of prefabricated reinforcement segments 528 in order to form the horizontal reinforcement assembly 514. Accordingly, in an embodiment, the plurality of movable stops 318 may be positioned based on the reinforcement assembly midline perimeter length. At least a portion of the plurality of prefabricated reinforcement segments 528 may be positioned via the plurality of movable stops 318. Such positioning may establish the overlap 538 between each adjacent segment of the plurality of prefabricated reinforcement segments 528.

In an embodiment, the jig table 316 may include at least one servo 320. The servo(s) 320 may be operably coupled to a portion of the plurality of movable stops 318, such as via a linkage 322. In such an embodiment, the servo(s) 320 may be actuated in order to alter a location of at least one of the plurality of movable stops 318 relative to a support surface 324 of the jig table 316.

The jig table 316 may be communicatively coupled to the controller 200 in an embodiment. In such an embodiment, the controller 200 of the additive printing system 300 may determine a required position for each of the plurality of movable stops 318. The required position may correspond to the positioning of the plurality of movable stops 318 that establishes the magnitude (M) of the overlap 538 between adjacent prefabricated reinforcement segments 528 of the plurality of prefabricated reinforcement segments 528. In an embodiment, the controller 200 may then generate a setpoint for the servo(s) 320 calculated to position each of the movable stops 318 at the required position.

Figure 6:
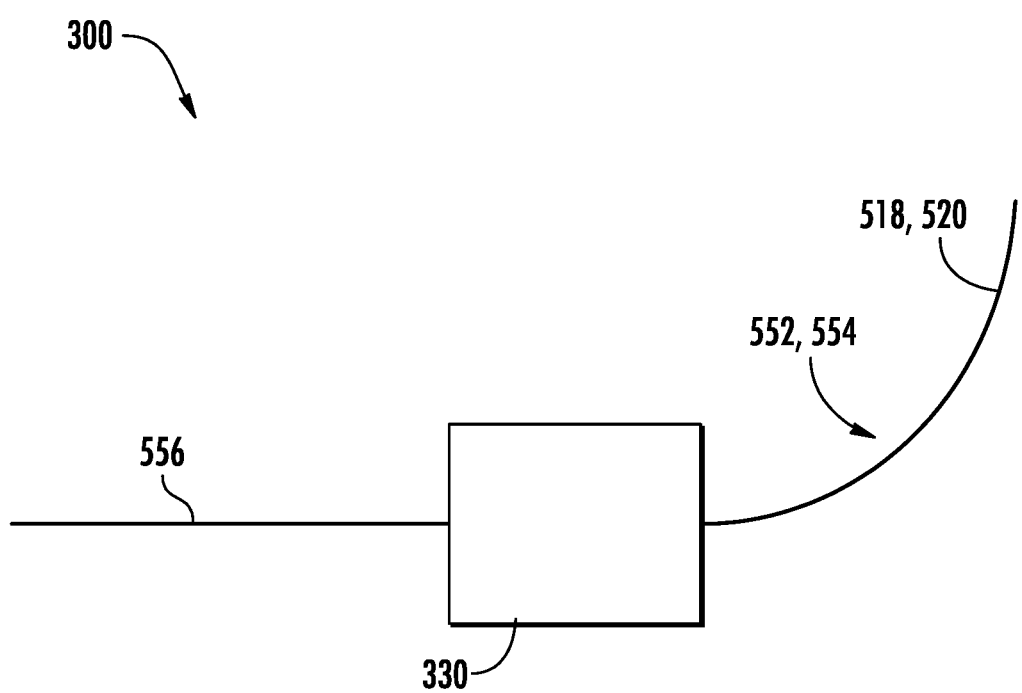
FIG. 6 illustrates a simplified top view of a portion of the horizontal reinforcement assembly and a material working apparatus according to the present disclosure.

As depicted in FIG. 6, in an embodiment, forming the horizontal reinforcement assembly 514 may include determining a required reinforcement assembly midline perimeter length based on the actual midline perimeter length. A required inner rail radius 552 may then be determined based on the required reinforcement assembly midline perimeter length. In an embodiment, a required outer rail radius 554 may similarly be determined based on the required reinforcement assembly midline perimeter length. The required inner and outer rail radius is 552, 554 may then be formed via a material working apparatus 330 of the additive printing system 300. For example, the material working apparatus 330 may apply a bend corresponding to the required inner rail radius 552 to first portion of rail stock 556. The first portion of rail stock 556 may have a length corresponding to the inner rail length. Similarly, in an embodiment, the material working apparatus 330 may apply a bend corresponding to the required outer rail radius 554 a second portion of rail stock 556. The second portion of rail stock 556 may have a length corresponding to the outer rail length. Additionally, in an embodiment, the material working apparatus 330 may be configured to couple (e.g., weld, adhere, or otherwise secure) the plurality of transverse members 522 between the inner and outer rails 518, 520.

Referring again to FIGS. 3 and 7, in order to determine the actual midline perimeter length of the first printed layer 512, the controller 200 may, in an embodiment, record an actual print path 332 of the printhead assembly 302. The actual print path 332 may be recorded by the controller 200 during the deposition of the first printed layer 512. For example, in an embodiment, the sensor(s) 311 may be utilized to continuously monitor the position of the support arm(s) 310. The position of the printhead assembly 302, and thus the print path 332, may be derived from the monitored positions of the support arm(s) 310. Accordingly, the actual midline perimeter length of the first printed layer 512 may be determined based on the actual print path 332 of the printhead assembly 302.

As particularly depicted in FIG. 7, the additive printing system 300 may include at least one optical scanner 334. The optical scanner(s) 334 may be a 3D scanner. As such, the optical scanner(s) 334 may be a non-contact scanner that utilizes cameras (e.g., a stereoscopic system) and/or lasers (e.g., a triangulation-based 3D laser scanner) to capture physical characteristics of the tower structure 500. In an embodiment, the optical scanner(s) 334 may be integrated with the printhead assembly 302. However, in an additional embodiment, the optical scanner(s) 334 may be an independent element supported by the support structure 304.

Following the deposition of the first printed layer 512, the optical scanner(s) 334 may, in an embodiment, be employed to optically scan the first printed layer 512. The controller 200 may then generate (as depicted by arrow $A_3$) a three-dimensional map 336 of the first printed layer 512 based on the optical scan. The controller 200 may, in an embodiment, determine the actual midline perimeter length of the first printed layer 512 based on the three-dimensional map 336 of the first printed layer 512.

Referring still to FIG. 7, in an embodiment, the additive printing system 300 may include at least one laser emitter 338. The laser emitter(s) 338 may be supported by the support structure 304 and/or the support arm(s) 310. In an embodiment, the laser emitter(s) 338 may project at least one placement guide onto the first printed layer 512. The placement guide(s) may be configured to facilitate the positioning of the horizontal reinforcement assembly 514 on the first printed layer 512. The placement guide(s) may, for example, be an illuminated ring, a plurality of alignment marks, an orientation point, and/or other similar features. It should be appreciated that the accurate placement of the horizontal reinforcement assembly 514 may facilitate the maximization of the structural integrity of the tower structure 500 as well as the placement of the second print layer 516.

Figure 8:
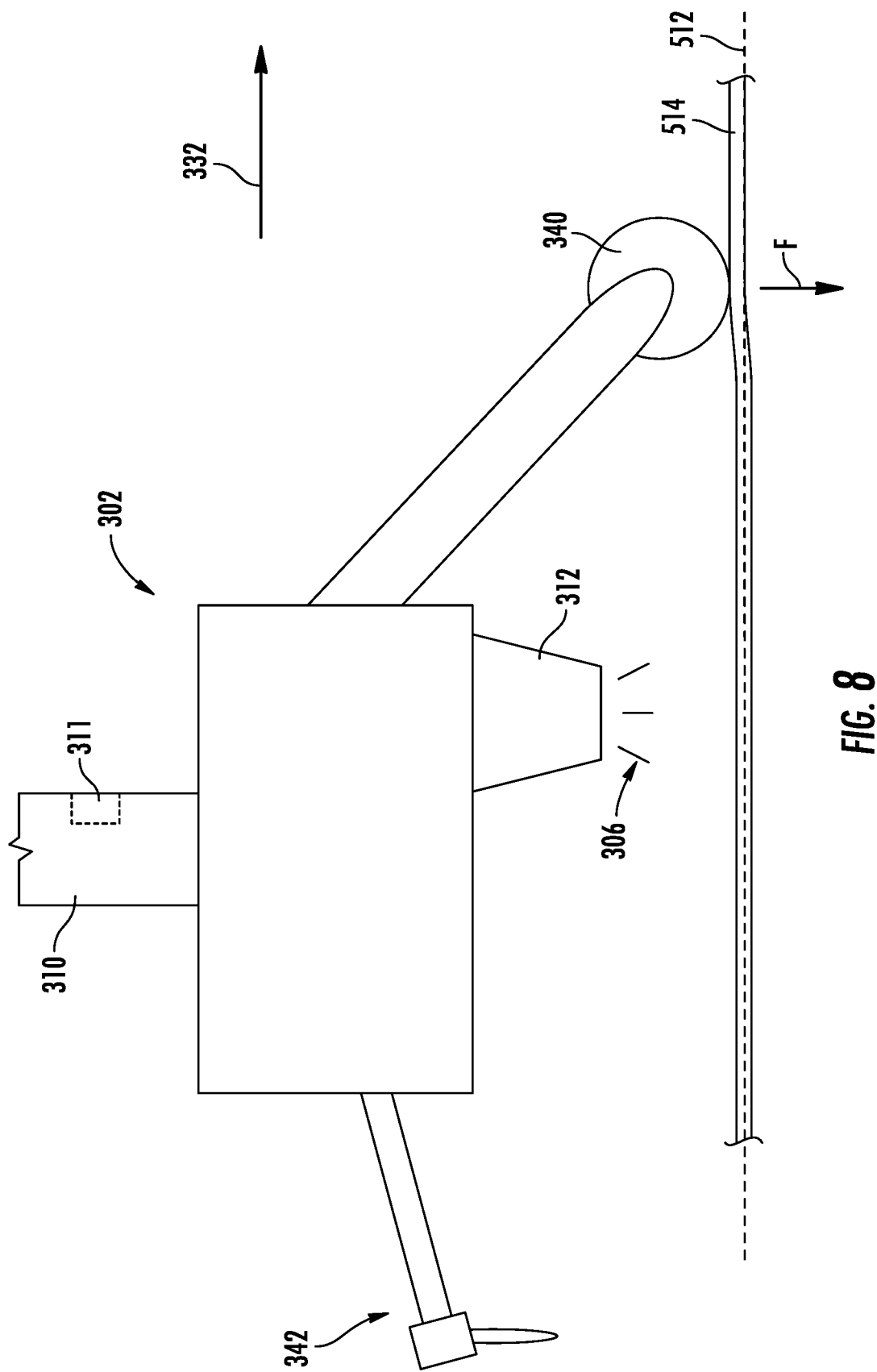
FIG. 8 illustrates a simplified profile view of one embodiment of a print head assembly of the additive printing system for additively manufacturing a tower structure according to the present disclosure.

Referring now to FIG. 8, in an embodiment, the printhead assembly 302 may include an actuatable roller 340. The actuatable roller 340 may be positioned to precede the print nozzle 312 during a deposition operation. In other words, the actuatable roller 340 may proceed along the print path 332 in advance of the print nozzle 312.

Following the positioning of the horizontal reinforcement assembly 514 on the first printed layer 512, the actuatable roller 340 may, in an embodiment, be utilized to exert a downward force (F) on the horizontal reinforcement assembly 514. In response to the downward force (F), the horizontal reinforcement assembly 514 may be embedded at least partially within the first printed layer 512. It should be appreciated that embedding the horizontal reinforcement assembly 514 at least partially within the first printed layer 512 while the cementitious material 506 remains soft/uncured may mitigate an impact of the horizontal reinforcement assembly 514 on the second print layer 516, and any subsequent print layers of the wall element 502.

Figure 9:
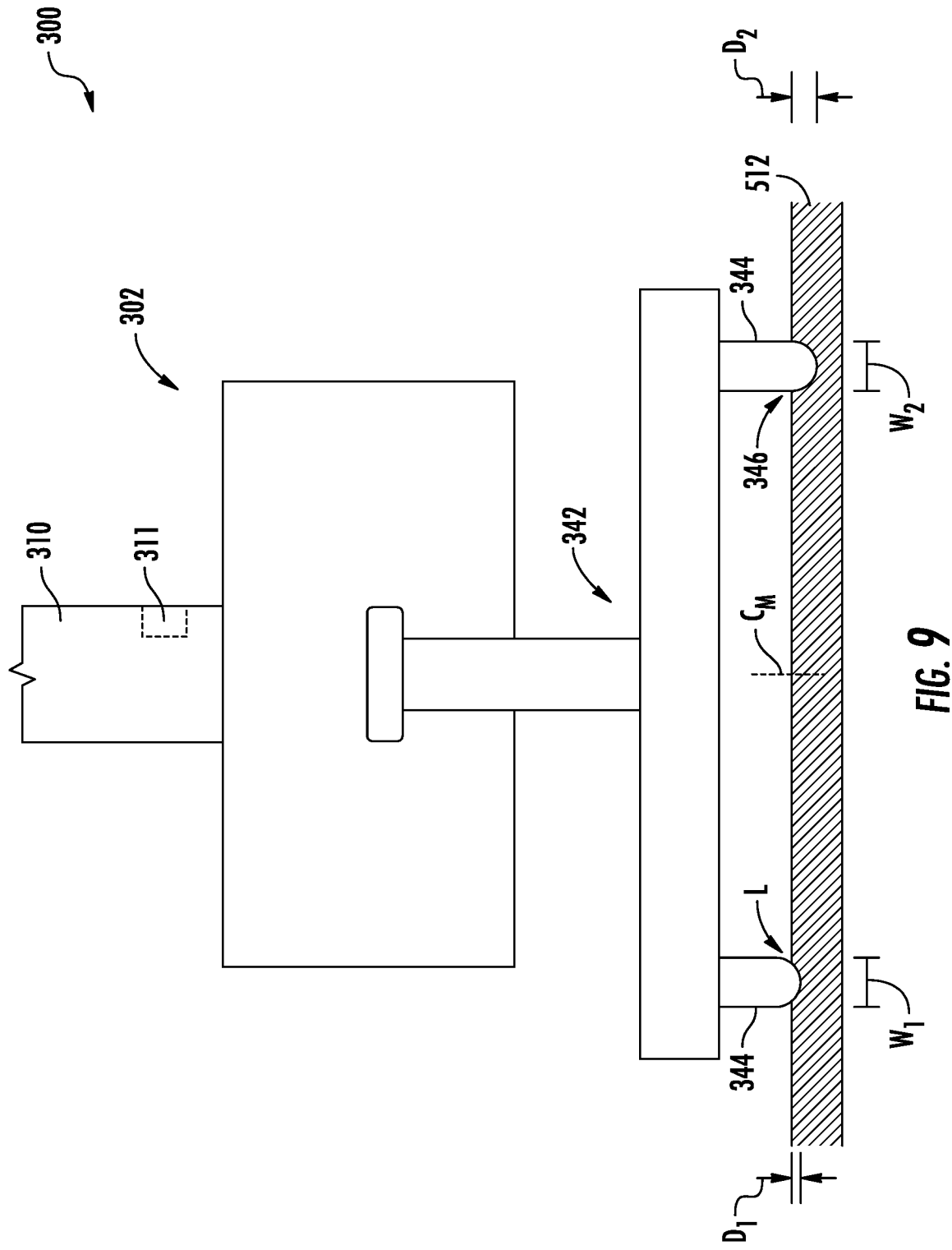
FIG. 9 illustrates a simplified rear view of a portion of a print head assembly of the additive printing system for additively manufacturing a tower structure according to the present disclosure.

Referring still to FIG. 8 and also to FIG. 9, in an embodiment, the printhead assembly 302 may include an actuatable groover 342. The actuatable groover 342 may be positioned to trail the print nozzle 312. In an embodiment, the actuatable groover may include at least one grooving element 344. The grooving element(s) 344 may be configured to form at least one depression/recess in an upper surface of the first printed layer 512 that parallels the midline reference curve ($C_M$). Accordingly, in an embodiment, the actuatable groover 342 may be positioned in contact with a portion of the wet cementitious material 506 of the first printed layer 512. In an embodiment, the actuatable groover 342 may be utilized to develop the depression/recess in the portion of the wet cementitious material 506 of the first printed layer 512.

In an embodiment, the actuatable groover 342 may be utilized to form a positioning line (L) in the portion of the wet cementitious material 506. The positioning line (L) may be configured to facilitate the accurate placement of the horizontal reinforcement assembly 514 on the first printed layer 512. Accordingly, the positioning line (L) may have a cross-sectional depth ($D_1$) that is less than a cross-sectional maximal width ($W_1$). The cross-sectional maximal width ($W_1$) may, for example, correspond to the maximal diameter of the inner and/or outer rail 518, 520. It should be appreciated that the cross-sectional depth ($D_1$) being less than a cross-sectional maximal width ($W_1$) may facilitate the positioning of a majority of the horizontal reinforcement assembly 514 above an upper surface of the first printed layer 512.

As depicted in FIG. 9, in an embodiment, the actuatable groover 342 may include at least two grooving elements 344. The grooving elements 344 may be utilized by the additive printing system 300 to form at least two parallel receiving grooves 346 (a single receiving groove 346 is depicted in FIG. 9 for purposes of illustration) in the first printed layer 512. The parallel receiving grooves 346 may be configured to receive at least the inner and outer rail 518, 520 of the horizontal reinforcement assembly 514. In an embodiment, each of the receiving grooves 346 may have a cross-sectional width ($W_2$) that corresponds to a cross-sectional width of the respective inner and outer rails 518, 520. Each of the receiving grooves 346 may, in an embodiment, have a cross-sectional depth ($D_2$) configured to at least partially embed the horizontal reinforcement assembly 514 in the first printed layer 512.

As depicted in FIG. 8, in an embodiment, the additive printing system 300 may include both the actuatable roller 340 and the actuatable groover 342. In such an embodiment, the actuatable groover 342 may be positioned to engage the first printed layer 512 during the deposition thereof (as depicted in FIG. 9). Following the deposition of the first printed layer 512, a separation may be established (as depicted in FIG. 8) between the grooving element(s) 344 and the wet cementitious material 506. The horizontal reinforcement assembly 514 may then be positioned in contact with the resultant positioning line (L) or parallel receiving grooves 346. With the horizontal reinforcement assembly 514 accurately positioned on the first printed layer 512, the actuatable roller 340 may be positioned in contact with the horizontal reinforcement assembly 514 in order to at least partially embed the horizontal reinforcement assembly 514 in the first printed layer 512. In conjunction with the exertion of the downward force (F) by the actuatable roller 340, the printhead assembly may deposit a portion of cementitious material 506 to print the second printed layer 516.

Figure 10:
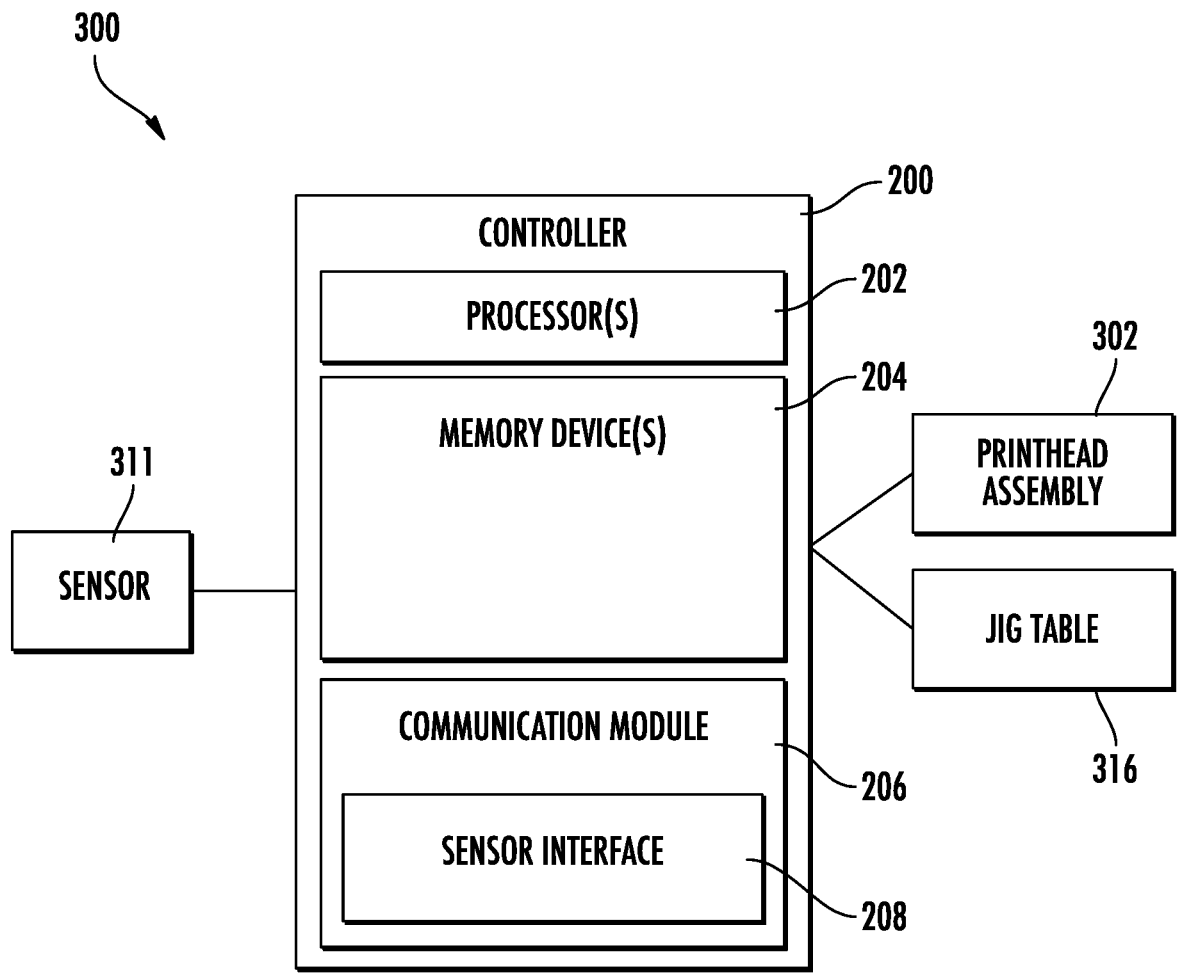
FIG. 10 illustrates a schematic diagram of a controller for use with the additive printing system according to the present disclosure.

As shown particularly in FIG. 10, a schematic diagram of one embodiment of suitable components of a controller 200 that may control the additive printing system 300 is illustrated. For example, as shown, the controller 200 may include one or more processor(s) 202 and associated memory device(s) 204 configured to perform a variety of computer-implemented functions (e.g., performing the methods, steps, calculations and the like and storing relevant data as disclosed herein). Additionally, the controller 200 may also include a communications module 206 to facilitate communications between the controller 200 and the various components of the additive printing system 300. Further, the communications module 206 may include a sensor interface 208 (e.g., one or more analog-to-digital converters) to permit signals transmitted from one or more sensors 311 to be converted into signals that can be understood and processed by the processors 202. It should be appreciated that the sensor(s) 311 may be communicatively coupled to the communications module 206 using any suitable means, such as a wired or a wireless connection. Additionally, the communications module 206 may also be operably coupled to a component of the additive printing system 300 so as to orchestrate the formation of the tower structure 500.

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 204 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 204 may generally be configured to store suitable computer-readable instructions that, when implemented by the processor(s) 202, configure the controller 200 to perform various functions including, but not limited to, manufacturing a tower structure, as described herein, as well as various other suitable computer-implemented functions.

Figure 11:
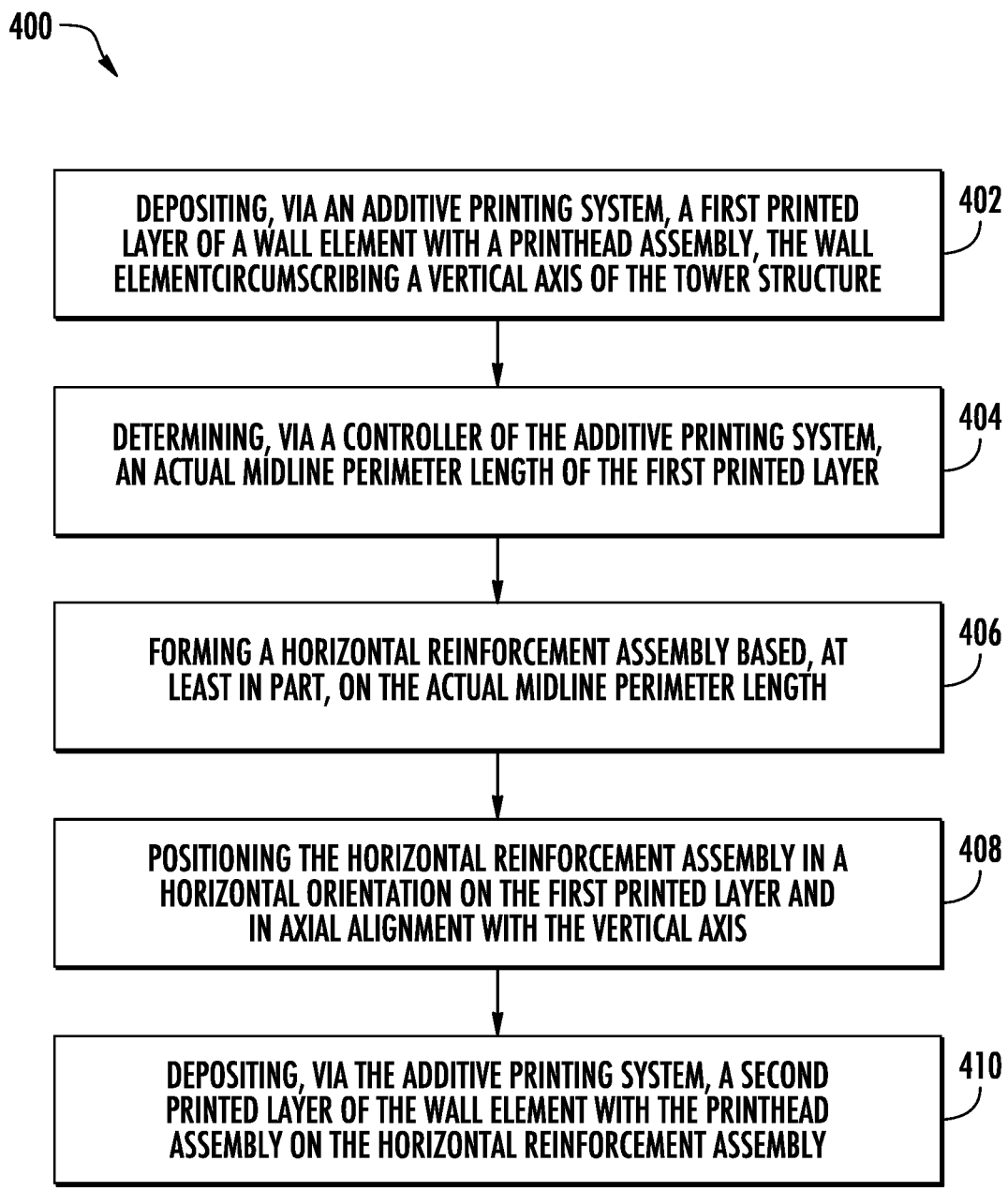
FIG. 11 illustrates a flow diagram of one embodiment of a method for manufacturing a tower structure according to the present disclosure.

Referring now to FIG. 11, a flow diagram of one embodiment of a method 400 for manufacturing a tower structure is presented. The method 400 may be implemented using, for instance, the additive printing system 300 of the present disclosure discussed above with references to FIGS. 1-10 to manufacture of the tower structure. FIG. 11 depicts steps performed in a particular order for purposes of illustration and discussion. Those of ordinary skill in the art, using the disclosures provided herein, will understand that various steps of the method 400, or any of the methods disclosed herein, may be adapted, modified, rearranged, performed simultaneously, or modified in various ways without deviating from the scope of the present disclosure.

As shown at (402), the method 400 may include depositing, via an additive printing system, a first printed layer of a wall element with a printhead assembly. The wall element may circumscribe a vertical axis of the tower structure. As shown at (404), the method 400 may include determining, via a controller of the additive printing system, an actual midline perimeter length of the first printed layer. As shown at (406), the method 400 may include forming a horizontal reinforcement assembly based, at least in part, on the actual midline perimeter length. As shown at (408), the method 400 may include positioning the horizontal reinforcement assembly in a horizontal orientation on the first printed layer and in axial alignment with the vertical axis. As shown at (410), the method 400 may include depositing, via the additive printing system, a second printed layer of the wall element with the printhead assembly on the horizontal reinforcement assembly.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

Clause 1. A method of manufacturing a tower structure, the method comprising: depositing, via an additive printing system, a first printed layer of a wall element with a printhead assembly, the wall element circumscribing a vertical axis of the tower structure; determining, via a controller of the additive printing system, an actual midline perimeter length of the first printed layer; forming a horizontal reinforcement assembly based, at least in part, on the actual midline perimeter length; positioning the horizontal reinforcement assembly in a horizontal orientation on the first printed layer and in axial alignment with the vertical axis; and depositing, via the additive printing system, a second printed layer of the wall element with the printhead assembly on the horizontal reinforcement assembly.

Clause 2. The method of clause 1, wherein the horizontal reinforcement assembly comprises: an inner rail having a length that is less than the actual midline perimeter length; an outer rail having a length that is greater than the actual midline perimeter length, wherein the inner rail and the outer rail have a shape corresponding to a horizontal shape of the first printed layer; and a plurality of transverse members, each transverse member having a first end coupled to the inner rail and a second end coupled to the outer rail.

Clause 3. The method of any preceding clause, wherein forming the horizontal reinforcement assembly further comprises: receiving a plurality of prefabricated reinforcement segments, each of the plurality of prefabricated reinforcement segments comprising an inner rail segment coupled to an outer rail segment via a portion of the plurality of transverse members, wherein each of the plurality of prefabricated reinforcement segments has a first segment end and a second segment end defined by the inner and outer rail segments; determining a magnitude of an overlap between adjacent prefabricated reinforcement segments of the plurality of prefabricated reinforcement segments configured to establish a reinforcement assembly midline perimeter length based on the actual midline perimeter length; and coupling the first segment end of each of the plurality of prefabricated reinforcement segments and the second segment end of each adjacent segment of the plurality of prefabricated reinforcement segments to establish the overlap therebetween based on the determined magnitude of overlap.

Clause 4. The method of any preceding clause, wherein establishing the overlap further comprises: positioning a plurality of movable stops of a jig table based on the reinforcement assembly midline perimeter length; and positioning a portion of the plurality of prefabricated reinforcement segments via the plurality of movable stops so as to establish the overlap between each adjacent segment of the plurality of prefabricated reinforcement segments.

Clause 5. The method of any preceding clause, wherein positioning the plurality of movable stops of the jig table further comprises: actuating at least one servo operably coupled to the plurality of movable stops; and altering a location of at least one movable stop of the plurality of movable stops relative to a support surface of the jig table.

Clause 6. The method of any preceding clause, wherein actuating the at least one servo further comprises: determining, via the controller, a required position for each of the plurality of movable stops that establishes the magnitude of the overlap between adjacent prefabricated reinforcement segments of the plurality of prefabricated reinforcement segments; and generating, via the controller, a setpoint for the at least one servo calculated to position each of the movable stops at the required position.

Clause 7. The method of any preceding clause, wherein forming the horizontal reinforcement assembly further comprises: receiving a plurality of prefabricated reinforcement segments, each of the plurality of prefabricated reinforcement segments comprising an inner rail segment coupled to an outer rail segment via a portion of the plurality of transverse members; and coupling each pair of adjacent prefabricated reinforcement segments of the plurality of prefabricated reinforcement segments via a coupler unit, wherein the coupler unit is configured to establish a reinforcement assembly midline perimeter length based on the actual midline perimeter length.

Clause 8. The method of any preceding clause, wherein positioning the horizontal reinforcement assembly further comprises: operably coupling at least one lifting element to a lifting interface of the coupler unit.

Clause 9. The method of any preceding clause, wherein forming the horizontal reinforcement assembly further comprises: determining a required reinforcement assembly midline perimeter length based on the actual midline perimeter length; determining a required inner rail radius based on the required reinforcement assembly midline perimeter length; applying, via a material working apparatus, a bend corresponding to the required inner rail radius to a first portion of rail stock, the first portion of rail stock having a length corresponding to the inner rail length; determining a required outer rail radius based on the required reinforcement assembly midline perimeter length; applying, via the material working apparatus, a bend corresponding to the required outer rail radius to a second portion of rail stock, the second portion of rail stock having a length corresponding to the outer rail length; and coupling the plurality of transverse members between the inner and outer rails via the material working apparatus.

Clause 10. The method of any preceding clause, wherein positioning the horizontal reinforcement assembly in the horizontal orientation on the first printed layer further comprises: establishing an operable coupling between at least one lifting element and the horizontal reinforcement assembly, the at least one lifting element being positioned so as to establish a separation relative to the first printed layer when the horizontal reinforcement assembly is positioned thereon; and following the positioning of the horizontal reinforcement assembly on the first printed layer, separating the at least one lifting element from the horizontal reinforcement assembly while maintaining at least the separation relative to the first printed layer, wherein the maintaining of at least the separation precludes a contact between the at least one lifting element and the first printed layer.

Clause 11. The method of any preceding clause, wherein determining the actual midline perimeter length of the first printed layer further comprises: recording, via the controller of the additive printing system, an actual print path of the printhead assembly during the deposition of the first printed layer; and determining the actual midline perimeter length of the first printed layer based on the actual print path of the printhead assembly.

Clause 12. The method of any preceding clause, wherein determining the actual midline perimeter length of the first printed layer further comprises: following the deposition of the first printed layer, optically scanning the first printed layer via an optical scanner of the additive printing system;

generating, via the controller of the additive printing system, a three-dimensional map of the first printed layer based on the optical scan; and determining, via the controller of the additive printing system, the actual midline perimeter length of the first printed layer based on the three-dimensional map of the first printed layer.

Clause 13. The method of claim 1, wherein the additive printing system further comprises at least one laser emitter, the method further comprising: projecting at least one placement guide onto the first printed layer via the at least one laser emitter, wherein the at least one placement guide is configured to guide the positioning of the horizontal reinforcement assembly on the first printed layer.

Clause 14. The method of any preceding clause, wherein the printhead assembly further comprises an actuatable roller positioned to precede a print nozzle during a deposition operation, the method further comprising: following the positioning of the horizontal reinforcement assembly on the first printed layer, exerting a downward force on the horizontal reinforcement assembly via the actuatable roller; and in response to the downward force, embedding the horizontal reinforcement assembly at least partially within the first printed layer.

Clause 15. The method of any preceding clause, wherein the printhead assembly further comprises an actuatable groover positioned to trail a print nozzle during a deposition operation, wherein depositing the first printed layer further comprises: positioning the actuatable groover in contact with a portion of wet cementitious material of the first print layer; and developing a depression in the portion of wet cementitious material via the actuatable groover.

Clause 16. The method of any preceding clause, wherein the printhead assembly further comprises an actuatable roller positioned to precede the print nozzle during a deposition operation, the method further comprising: following the positioning of the horizontal reinforcement assembly on the first printed layer, establishing a separation between the actuatable groover and first printed layer; positioning the actuatable roller in contact with the horizontal reinforcement assembly; exerting a downward force on the horizontal reinforcement assembly via the actuatable roller; and in response to the downward force, embedding the horizontal reinforcement assembly at least partially within the first printed layer.

Clause 17. The method of any preceding clause, wherein developing the depression in the portion of wet cementitious material further comprises: forming a positioning line in the portion of wet cementitious material via the actuatable groover, the positioning line having a cross-sectional depth which is less than a cross-sectional maximal width.

Clause 18. The method of any preceding clause, wherein the actuatable groover comprises at least two grooving elements, and wherein developing the depression in the portion of wet cementitious material further comprises: forming at least two parallel receiving grooves in the first printed layer via the at least two grooving elements configured to receive at least an inner rail and an outer rail of the horizontal reinforcement assembly, wherein each of the at least two parallel receiving grooves have a cross-sectional width corresponding to a cross-sectional width of the respective inner and outer rail and a cross-sectional depth configured to at least partially embed the horizontal reinforcement assembly in the first printed layer.

Clause 19. An additive printing system for manufacturing a tower structure, the tower structure comprising a wall element circumscribing a vertical axis of the tower structure, the additive printing system comprising: a support structure; an optical scanner; a printhead assembly operably coupled to the support structure; and a controller communicatively coupled to the printhead assembly and the optical scanner, the controller comprising at least one processor configured to perform or direct a plurality of operations, the plurality of operations comprising: depositing a first printed layer of a wall element with the printhead assembly, optically scanning the first printed layer via the optical scanner, generating a three-dimensional map of the first printed layer based on the optical scan, determining an actual midline perimeter length of the first printed layer based on the three-dimensional map of the first printed layer, forming a horizontal reinforcement assembly based, at least in part, on the actual midline perimeter, wherein the horizontal reinforcement assembly comprises an inner rail having a length that is less than the actual midline perimeter length, an outer rail having a length that is greater than the actual midline perimeter length, and a plurality of transverse members, each transverse member having a first end coupled to the inner rail and a second end coupled to the outer rail, wherein the inner rail and the outer rail have a shape corresponding to a horizontal shape of the first printed layer, positioning the horizontal reinforcement assembly in a horizontal orientation on the first printed layer and in axial alignment with the vertical axis, and depositing a second printed layer of the wall element with the printhead assembly on the horizontal reinforcement layer.

Clause 20. The additive printing system of any preceding clause, wherein forming the horizontal reinforcement assembly further comprises: receiving a plurality of prefabricated reinforcement segments, each of the plurality of prefabricated reinforcement segments comprising an inner rail segment coupled to an outer rail segment via a portion of the plurality of transverse members, wherein each of the plurality of prefabricated reinforcement segments has a first segment end and a second segment end defined by the inner and outer rail segments; determining a magnitude of an overlap between adjacent prefabricated reinforcement segments of the plurality of prefabricated reinforcement segments configured to establish a reinforcement assembly midline perimeter length based on the actual midline perimeter length; receiving, via a controller of a jig table, the actual midline perimeter from the controller of the additive printing system; determining, via the controller of the jig table, a required position for each of a plurality of movable stops that establishes the magnitude of the overlap between adjacent prefabricated reinforcement segments of the plurality of prefabricated reinforcement segments; generating, via the controller of the jig table, a setpoint for at least one servo of the jig table calculated to position each of the movable stops at the required position, the at least one servo being operably coupled to the plurality of movable stops of the jig table so as to position the plurality of movable stops based on the reinforcement assembly midline perimeter length; actuating the at least one servo in accordance with the setpoint; positioning a portion of the plurality of prefabricated reinforcement segments via the plurality of movable stops so as to establish the overlap between each adjacent segment of the plurality of prefabricated reinforcement segments; and coupling the first segment end of each of the plurality of prefabricated reinforcement segments and the second segment end of each adjacent segment of the plurality of prefabricated reinforcement segments.

What is claimed is:

1. A method of manufacturing a tower structure, the method comprising:
   depositing, via an additive printing system, a first printed layer of a wall element with a printhead assembly, the wall element circumscribing a vertical axis of the tower structure;
   determining, via a controller of the additive printing system, an actual midline perimeter length of the first printed layer;
   forming a horizontal reinforcement assembly based, at least in part, on the actual midline perimeter length;
   positioning the horizontal reinforcement assembly in a horizontal orientation on the first printed layer and in axial alignment with the vertical axis; and
   depositing, via the additive printing system, a second printed layer of the wall element with the printhead assembly on the horizontal reinforcement assembly.

2. The method of claim 1, wherein the horizontal reinforcement assembly comprises:
   an inner rail having a length that is less than the actual midline perimeter length;
   an outer rail having a length that is greater than the actual midline perimeter length, wherein the inner rail and the outer rail have a shape corresponding to a horizontal shape of the first printed layer; and
   a plurality of transverse members, each transverse member having a first end coupled to the inner rail and a second end coupled to the outer rail.

3. The method of claim 2, wherein forming the horizontal reinforcement assembly further comprises:
   receiving a plurality of prefabricated reinforcement segments, each of the plurality of prefabricated reinforcement segments comprising an inner rail segment coupled to an outer rail segment via a portion of the plurality of transverse members, wherein each of the plurality of prefabricated reinforcement segments has a first segment end and a second segment end defined by the inner and outer rail segments;
   determining a magnitude of an overlap between adjacent prefabricated reinforcement segments of the plurality of prefabricated reinforcement segments configured to establish a reinforcement assembly midline perimeter length based on the actual midline perimeter length; and
   coupling the first segment end of each of the plurality of prefabricated reinforcement segments and the second segment end of each adjacent segment of the plurality of prefabricated reinforcement segments to establish the overlap therebetween based on the determined magnitude of overlap.

4. The method of claim 3, wherein establishing the overlap further comprises:
   positioning a plurality of movable stops of a jig table based on the reinforcement assembly midline perimeter length; and
   positioning a portion of the plurality of prefabricated reinforcement segments via the plurality of movable stops so as to establish the overlap between each adjacent segment of the plurality of prefabricated reinforcement segments.

5. The method of claim 4, wherein positioning the plurality of movable stops of the jig table further comprises:
   actuating at least one servo operably coupled to the plurality of movable stops; and
   altering a location of at least one movable stop of the plurality of movable stops relative to a support surface of the jig table.

6. The method of claim 5, wherein actuating the at least one servo further comprises:
   determining, via the controller, a required position for each of the plurality of movable stops that establishes the magnitude of the overlap between adjacent prefabricated reinforcement segments of the plurality of prefabricated reinforcement segments; and
   generating, via the controller, a setpoint for the at least one servo calculated to position each of the movable stops at the required position.

7. The method of claim 2, wherein forming the horizontal reinforcement assembly further comprises:
   receiving a plurality of prefabricated reinforcement segments, each of the plurality of prefabricated reinforcement segments comprising an inner rail segment coupled to an outer rail segment via a portion of the plurality of transverse members; and
   coupling each pair of adjacent prefabricated reinforcement segments of the plurality of prefabricated reinforcement segments via a coupler unit, wherein the coupler unit is configured to establish a reinforcement assembly midline perimeter length based on the actual midline perimeter length.

8. The method of claim 7, wherein positioning the horizontal reinforcement assembly further comprises:
   operably coupling at least one lifting element to a lifting interface of the coupler unit.

9. The method of claim 2, wherein forming the horizontal reinforcement assembly further comprises:
   determining a required reinforcement assembly midline perimeter length based on the actual midline perimeter length;
   determining a required inner rail radius based on the required reinforcement assembly midline perimeter length;
   applying, via a material working apparatus, a bend corresponding to the required inner rail radius to a first portion of rail stock, the first portion of rail stock having a length corresponding to the inner rail length;
   determining a required outer rail radius based on the required reinforcement assembly midline perimeter length;
   applying, via the material working apparatus, a bend corresponding to the required outer rail radius to a second portion of rail stock, the second portion of rail stock having a length corresponding to the outer rail length; and
   coupling the plurality of transverse members between the inner and outer rails via the material working apparatus.

10. The method of claim 2, wherein positioning the horizontal reinforcement assembly in the horizontal orientation on the first printed layer further comprises:
    establishing an operable coupling between at least one lifting element and the horizontal reinforcement assembly, the at least one lifting element being positioned so as to establish a separation relative to the first printed layer when the horizontal reinforcement assembly is positioned thereon; and
    following the positioning of the horizontal reinforcement assembly on the first printed layer, separating the at least one lifting element from the horizontal reinforcement assembly while maintaining at least the separation relative to the first printed layer, wherein the maintaining of at least the separation precludes a contact between the at least one lifting element and the first printed layer.

11. The method of claim 1, wherein determining the actual midline perimeter length of the first printed layer further comprises:
   recording, via the controller of the additive printing system, an actual print path of the printhead assembly during the deposition of the first printed layer; and
   determining the actual midline perimeter length of the first printed layer based on the actual print path of the printhead assembly.

12. The method of claim 1, wherein determining the actual midline perimeter length of the first printed layer further comprises:
   following the deposition of the first printed layer, optically scanning the first printed layer via an optical scanner of the additive printing system;
   generating, via the controller of the additive printing system, a three-dimensional map of the first printed layer based on the optical scan; and
   determining, via the controller of the additive printing system, the actual midline perimeter length of the first printed layer based on the three-dimensional map of the first printed layer.

13. The method of claim 1, wherein the additive printing system further comprises at least one laser emitter, the method further comprising:
   projecting at least one placement guide onto the first printed layer via the at least one laser emitter, wherein the at least one placement guide is configured to guide the positioning of the horizontal reinforcement assembly on the first printed layer.

14. The method of claim 1, wherein the printhead assembly further comprises an actuatable roller positioned to precede a print nozzle during a deposition operation, the method further comprising:
   following the positioning of the horizontal reinforcement assembly on the first printed layer, exerting a downward force on the horizontal reinforcement assembly via the actuatable roller; and
   in response to the downward force, embedding the horizontal reinforcement assembly at least partially within the first printed layer.

15. The method of claim 1, wherein the printhead assembly further comprises an actuatable groover positioned to trail a print nozzle during a deposition operation, wherein depositing the first printed layer further comprises:
   positioning the actuatable groover in contact with a portion of wet cementitious material of the first print layer; and
   developing a depression in the portion of wet cementitious material via the actuatable groover.

16. The method of claim 15, wherein the printhead assembly further comprises an actuatable roller positioned to precede the print nozzle during a deposition operation, the method further comprising:
   following the positioning of the horizontal reinforcement assembly on the first printed layer, establishing a separation between the actuatable groover and first printed layer;
   positioning the actuatable roller in contact with the horizontal reinforcement assembly;
   exerting a downward force on the horizontal reinforcement assembly via the actuatable roller; and
   in response to the downward force, embedding the horizontal reinforcement assembly at least partially within the first printed layer.

17. The method of claim 15, wherein developing the depression in the portion of wet cementitious material further comprises:
   forming a positioning line in the portion of wet cementitious material via the actuatable groover, the positioning line having a cross-sectional depth which is less than a cross-sectional maximal width.

18. The method of claim 15, wherein the actuatable groover comprises at least two grooving elements, and wherein developing the depression in the portion of wet cementitious material further comprises:
   forming at least two parallel receiving grooves in the first printed layer via the at least two grooving elements configured to receive at least an inner rail and an outer rail of the horizontal reinforcement assembly, wherein each of the at least two parallel receiving grooves have a cross-sectional width corresponding to a cross-sectional width of the respective inner and outer rail and a cross-sectional depth configured to at least partially embed the horizontal reinforcement assembly in the first printed layer.

19. An additive printing system for manufacturing a tower structure, the tower structure comprising a wall element circumscribing a vertical axis of the tower structure, the additive printing system comprising:
   a support structure;
   an optical scanner;
   a printhead assembly operably coupled to the support structure; and
   a controller communicatively coupled to the printhead assembly and the optical scanner, the controller comprising at least one processor configured to perform or direct a plurality of operations, the plurality of operations comprising:
      depositing a first printed layer of a wall element with the printhead assembly,
      optically scanning the first printed layer via the optical scanner,
      generating a three-dimensional map of the first printed layer based on the optical scan,
      determining an actual midline perimeter length of the first printed layer based on the three-dimensional map of the first printed layer,
      forming a horizontal reinforcement assembly based, at least in part, on the actual midline perimeter, wherein the horizontal reinforcement assembly comprises an inner rail having a length that is less than the actual midline perimeter length, an outer rail having a length that is greater than the actual midline perimeter length, and a plurality of transverse members, each transverse member having a first end coupled to the inner rail and a second end coupled to the outer rail, wherein the inner rail and the outer rail have a shape corresponding to a horizontal shape of the first printed layer,
      positioning the horizontal reinforcement assembly in a horizontal orientation on the first printed layer and in axial alignment with the vertical axis, and
      depositing a second printed layer of the wall element with the printhead assembly on the horizontal reinforcement layer.

20. The additive printing system of claim 19, wherein forming the horizontal reinforcement assembly further comprises:

receiving a plurality of prefabricated reinforcement segments, each of the plurality of prefabricated reinforcement segments comprising an inner rail segment coupled to an outer rail segment via a portion of the plurality of transverse members, wherein each of the plurality of prefabricated reinforcement segments has a first segment end and a second segment end defined by the inner and outer rail segments;

determining a magnitude of an overlap between adjacent prefabricated reinforcement segments of the plurality of prefabricated reinforcement segments configured to establish a reinforcement assembly midline perimeter length based on the actual midline perimeter length;

receiving, via a controller of a jig table, the actual midline perimeter from the controller of the additive printing system;

determining, via the controller of the jig table, a required position for each of a plurality of movable stops that establishes the magnitude of the overlap between adjacent prefabricated reinforcement segments of the plurality of prefabricated reinforcement segments;

generating, via the controller of the jig table, a setpoint for at least one servo of the jig table calculated to position each of the movable stops at the required position, the at least one servo being operably coupled to the plurality of movable stops of the jig table so as to position the plurality of movable stops based on the reinforcement assembly midline perimeter length;

actuating the at least one servo in accordance with the setpoint;

positioning a portion of the plurality of prefabricated reinforcement segments via the plurality of movable stops so as to establish the overlap between each adjacent segment of the plurality of prefabricated reinforcement segments; and coupling the first segment end of each of the plurality of prefabricated reinforcement segments and the second segment end of each adjacent segment of the plurality of prefabricated reinforcement segments.

\* \* \* \* \*